US012695014B2

(12) United States Patent
Labombard et al.

(10) Patent No.: US 12,695,014 B2
(45) Date of Patent: Jul. 28, 2026

(54) CONDUCTOR AND COOLANT SCHEMES FOR SPIRAL-GROOVED, STACKED PLATE, NON-INSULATED SUPERCONDUCTING MAGNETS

(71) Applicants: Massachusetts Institute of Technology, Cambridge, MA (US); Commonwealth Fusion Systems LLC, Devens, MA (US)

(72) Inventors: Brian Labombard, Belmont, MA (US); Robert Mumgaard, Boston, MA (US); William Beck, Alton Bay, NH (US); Jeffrey Doody, Melrose, MA (US); Rui Vieira, Billerica, MA (US); Richard C. Leccacorvi, Arlington, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 946 days.

(21) Appl. No.: 17/796,762

(22) PCT Filed: Mar. 25, 2021

(86) PCT No.: PCT/US2021/024160
§ 371 (c)(1),
(2) Date: Aug. 1, 2022

(87) PCT Pub. No.: WO2021/195383
PCT Pub. Date: Sep. 30, 2021

(65) Prior Publication Data

US 2023/0073419 A1 Mar. 9, 2023

Related U.S. Application Data

(60) Provisional application No. 63/000,393, filed on Mar. 26, 2020, provisional application No. 63/027,540, filed on May 20, 2020.

(51) Int. Cl.
*H01F 6/04* (2006.01)
*H01F 1/055* (2006.01)

(52) U.S. Cl.
CPC ............... *H01F 6/04* (2013.01); *H01F 1/055* (2013.01)

(58) Field of Classification Search
CPC ........................................................ H01F 6/04
See application file for complete search history.

(56) References Cited

U.S. PATENT DOCUMENTS 1,955,318 A 4/1934 West
2,982,889 A 5/1961 Whearley
(Continued)

FOREIGN PATENT DOCUMENTS

CA 2 304 633 4/1998
CA 2 374 326 A1 1/2001
(Continued)

OTHER PUBLICATIONS

Korean Notice of Allowance (with English Translation) dated May 20, 2025 for Korean Application No. 10-2022-7036137, 5 Pages.
(Continued)

*Primary Examiner* — Paul A Wartalowicz
(74) *Attorney, Agent, or Firm* — Daly, Crowley, Mofford & Durkee, LLP

(57) ABSTRACT

Schemes are described for conductor and coolant placement in stacked-plate superconducting magnets, including arranging coolant channels and conducting channels within the plates on opposing faces. If the two types of channels are aligned with one another across the plate stacks, the plates may be stacked such that the cooling channel in one plate is adjacent to the conducting channel of the neighboring plate. By stacking a number of these plates, therefore, cooling may be supplied to each conducting channel through the cooling
(Continued)

channels of each neighboring plate. Moreover, by aligning the two types of channels, the stacks of plates may have improved mechanical strength because mechanical load paths through the entire stack that do not pass through any of the channels may be created. This arrangement of channels may produce a very strong stack of plates that can withstand high Lorentz loads.

33 Claims, 17 Drawing Sheets

(56) References Cited

U.S. PATENT DOCUMENTS

| | | | |
|---|---|---|---|
| 3,210,610 | A | 10/1965 | Fraser |
| 3,281,738 | A | 10/1966 | Hanak |
| 3,293,008 | A | 12/1966 | Allen et al. |
| 3,416,111 | A | 12/1968 | Bogner |
| 3,428,925 | A | 2/1969 | Bogner et al. |
| 3,919,677 | A | 11/1975 | Young |
| 3,983,521 | A | 9/1976 | Furuto et al. |
| 4,135,294 | A | 1/1979 | Brown |
| 4,218,668 | A | 8/1980 | Tada et al. |
| 4,344,807 | A | 8/1982 | Dennesen et al. |
| 4,377,905 | A | 3/1983 | Agatsuma et al. |
| 4,586,012 | A | 4/1986 | Koizumi et al. |
| 5,122,772 | A | 6/1992 | Shimamoto et al. |
| 5,173,678 | A | 12/1992 | Bellows et al. |
| 5,231,078 | A | 7/1993 | Riebman |
| 5,331,800 | A | 7/1994 | Schaumburg et al. |
| 5,426,408 | A | 6/1995 | Jones et al. |
| 5,581,220 | A | 12/1996 | Rodenbush et al. |
| 5,719,106 | A | 2/1998 | Mukai et al. |
| 5,902,774 | A | 5/1999 | Muranaka et al. |
| 5,914,647 | A | 6/1999 | Aized et al. |
| 6,128,174 | A | 10/2000 | Ritter et al. |
| 6,194,985 | B1 | 2/2001 | Tanaka et al. |
| 6,231,078 | B1 | 5/2001 | Kokeguchi |
| 6,271,474 | B1 | 8/2001 | Fujikami et al. |
| 6,472,966 | B1 | 10/2002 | Ehrhart |
| 6,576,843 | B1 | 6/2003 | Ashworth |
| 6,601,289 | B1 | 8/2003 | Kobayashi |
| 8,344,843 | B2 | 1/2013 | Larsen |
| 8,437,819 | B2 | 5/2013 | Takayasu et al. |
| 9,183,970 | B2 | 11/2015 | Maeda et al. |
| 9,324,486 | B2 | 4/2016 | Hahn et al. |
| 9,697,930 | B2 | 7/2017 | Takemoto |
| 10,062,485 | B2 | 8/2018 | Iwasa et al. |
| 10,079,092 | B2 | 9/2018 | Iwasa et al. |
| 10,319,500 | B2 | 6/2019 | Ko et al. |
| 10,332,640 | B2 | 6/2019 | Sykes et al. |
| 10,804,018 | B2 | 10/2020 | Hahn et al. |
| 10,861,626 | B2 | 12/2020 | Kim et al. |
| 11,094,439 | B2 | 8/2021 | Labombard et al. |
| 11,417,464 | B2 | 8/2022 | Labombard et al. |
| 11,659,776 | B2 | 5/2023 | Ha et al. |
| 11,948,704 | B2 | 4/2024 | Hubbard et al. |
| 2005/0127928 | A1 | 6/2005 | Kirby |
| 2006/0071747 | A1 | 4/2006 | Friedman et al. |
| 2006/0077025 | A1 | 4/2006 | Funaki et al. |
| 2009/0194316 | A1 | 8/2009 | Thomas et al. |
| 2011/0143247 | A1* | 6/2011 | An ........................ H01M 8/241 429/434 |
| 2012/0214674 | A1 | 8/2012 | Blakes et al. |
| 2013/0255991 | A1 | 10/2013 | Snitchler et al. |
| 2014/0224445 | A1 | 8/2014 | Kikuchi |
| 2014/0262113 | A1 | 9/2014 | Feger |
| 2014/0302997 | A1 | 10/2014 | Takayasu |
| 2014/0312999 | A1 | 10/2014 | Oomen |
| 2015/0123760 | A1 | 5/2015 | Meinke |
| 2016/0155541 | A1 | 6/2016 | Jenner et al. |
| 2016/0156174 | A1 | 6/2016 | Kirby et al. |
| 2016/0232988 | A1 | 8/2016 | Sykes et al. |
| 2017/0179364 | A1 | 6/2017 | Schwartz et al. |
| 2017/0221609 | A1* | 8/2017 | Kurihara ................ H01B 12/06 |
| 2017/0338009 | A1 | 11/2017 | van der Laan |
| 2018/0158586 | A1 | 6/2018 | Meinke et al. |
| 2018/0164388 | A1 | 6/2018 | Guenter et al. |
| 2018/0261753 | A1* | 9/2018 | Wilson ................. H10N 60/203 |
| 2019/0074119 | A1 | 3/2019 | Hahn |
| 2019/0172612 | A1 | 6/2019 | Ohsugi |
| 2019/0385771 | A1 | 12/2019 | Painter |
| 2020/0111589 | A1* | 4/2020 | Yamaguchi ........ H10N 60/0801 |
| 2020/0169158 | A1* | 5/2020 | Bührer ................... H02K 55/04 |
| 2020/0194153 | A1 | 6/2020 | Brunner |
| 2020/0211744 | A1 | 7/2020 | Labombard et al. |
| 2020/0279681 | A1 | 9/2020 | Radovinsky et al. |
| 2020/0365304 | A1* | 11/2020 | Slade ..................... G21B 1/057 |
| 2020/0381155 | A1 | 12/2020 | Slade |
| 2021/0350957 | A1 | 11/2021 | Takayasu et al. |
| 2021/0407716 | A1 | 12/2021 | Radovinsky et al. |
| 2022/0013256 | A1 | 1/2022 | Hubbard et al. |
| 2022/0068528 | A1 | 3/2022 | Brunner |
| 2022/0336130 | A1 | 10/2022 | Labombard et al. |
| 2023/0101820 | A1 | 3/2023 | Radovinsky et al. |

FOREIGN PATENT DOCUMENTS

| | | | |
|---|---|---|---|
| CN | 102867601 | A | 1/2013 |
| CN | 103035354 | A | 4/2013 |
| CN | 103794297 | | 5/2014 |
| CN | 106 298 149 | A | 1/2017 |
| CN | 109 102 987 | A | 12/2018 |
| EP | 0 504 896 | A1 | 9/1992 |
| EP | 0 667 627 | B1 | 11/1998 |
| EP | 3 499 519 | | 6/2019 |
| GB | 2578307 | A | 5/2020 |
| GB | 2600110 | A | 4/2022 |
| JP | S 54-60476 | A | 5/1979 |
| JP | S54106864 | | 8/1979 |
| JP | 55125601 | | 9/1980 |
| JP | S55125601 | | 9/1980 |
| JP | S57108314 | | 7/1982 |
| JP | S 58-40803 | A | 3/1983 |
| JP | 61-159711 | | 7/1986 |
| JP | S61159711 | | 7/1986 |
| JP | S63293801 | | 11/1988 |
| JP | S 64-39008 | A | 2/1989 |
| JP | H04292810 | | 10/1992 |
| JP | H 06-243745 | A | 9/1994 |
| JP | 08-055526 | | 2/1996 |
| JP | H08138927 | A | 5/1996 |
| JP | H08191538 | A | 7/1996 |
| JP | H 02873924 | | 10/1996 |
| JP | H08273924 | A | 10/1996 |
| JP | 09027416 | | 1/1997 |
| JP | H 11-3814 | A | 1/1999 |
| JP | H 11-43308 | A | 2/1999 |
| JP | H11135320 | | 5/1999 |
| JP | H11135320 | A | 5/1999 |
| JP | 2000277322 | A | 6/2000 |
| JP | 2003112097 | | 4/2003 |
| JP | 2004527431 | | 9/2004 |
| JP | 2006-196720 | A | 7/2006 |
| JP | 2006196720 | | 7/2006 |
| JP | 2008244280 | | 10/2008 |
| JP | 2008244280 | A | 10/2008 |
| JP | 2009-170550 | A | 7/2009 |
| JP | 2009188366 | | 8/2009 |
| JP | 2010181797 | | 8/2010 |
| JP | 2011-228065 | A | 11/2011 |
| JP | 2012-195413 | A | 10/2012 |
| JP | 2013080849 | | 5/2013 |
| JP | 2015-012182 | A | 1/2015 |
| JP | 2017-63083 | A | 3/2017 |
| JP | 6180729 | B2 | 8/2017 |
| JP | 2017175031 | | 9/2017 |
| JP | 2018532262 | | 11/2018 |
| JP | 2019102298 | | 6/2019 |
| KR | 10-0717351 | B1 | 5/2007 |
| KR | 20120052166 | | 5/2012 |
| KR | 10-1637468 | | 7/2016 |
| WO | WO 01/06524 | | 1/2001 |
| WO | WO 2008/011184 | | 1/2008 |

(56) References Cited

FOREIGN PATENT DOCUMENTS

| | | | |
|---|---|---|---|
| WO | WO 2010/042259 | | 4/2010 |
| WO | WO 2011/074092 | A1 | 6/2011 |
| WO | WO 2014/201242 | A1 | 12/2014 |
| WO | WO 2017/042543 | A1 | 3/2017 |
| WO | WO 2020/139832 | | 7/2020 |
| WO | WO 2020/139832 | A1 | 7/2020 |
| WO | WO 2021/055037 | A2 | 3/2021 |
| WO | WO 2021/055037 | A3 | 3/2021 |
| WO | WO 2021/178697 | | 9/2021 |
| WO | WO2021/195330 | | 9/2021 |
| WO | WO2021/195383 | | 9/2021 |
| WO | WO 2021/236185 | | 11/2021 |
| WO | WO 2021/236901 | | 11/2021 |
| WO | WO 2021/252330 | A1 | 12/2021 |
| WO | WO 2021/262319 | | 12/2021 |
| WO | WO 2022/019989 | | 1/2022 |
| WO | PCT/US2022/030047 | | 5/2022 |
| WO | PCT/US2022/049876 | | 11/2022 |

OTHER PUBLICATIONS

Canadian Exam Report dated May 26, 2025 for Canadian Application No. 3,173,407, 3 Pages.
PCT International Preliminary Report on Patentability dated Jun. 12, 2025 for International Application No. PCT/US2023/081450; 16 Pages.
PCT International Preliminary Report on Patentability dated Jun. 26, 2025 for International Application No. PCT/US2023/083812; 8 Pages.
U.S. Appl. No. 17/796,481, filed Jul. 29, 2022, Radovinsky, et al.
U.S. Appl. No. 17/919,606, filed Oct. 18, 2022, Radovinsky, et al.
U.S. Appl. No. 17/919,942, filed Oct. 19, 2022, Labombard, et al.
U.S. Appl. No. 18/008,279, filed Dec. 5, 2022, Radovinsky, et al.
Green, et al.; "The ITER Project: Status and Prospects"; IEEE Transactions on Magnetics; vol. 32; No. 4; Jul. 1996; 6 Pages.
Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.
Alfaro, et al.; "Vacuum Assisted Liquified Metal (VALM) TSV Filling Method with Superconductive Material"; MEMS 2018; Jan. 21-25, 2018; 4 Pages.
Barth, et al.; "Electro-mechanical properties of REBCO coated conductors from various industrial manufacturers at 77K, self-field and 4.2K, 19T"; Superconductor Science and Technology; Feb. 13, 2015; 11 Pages.
Bauer, et al.; "Review of material properties, past experiences, procedures, issues and results for a possible solder filled cable as Plan B conductor for the EFDA dipole magnet (Draft Vs 1)"; EFDA CSU report LRP 830/07; May 2007; 29 Pages.
Bauer, et al.; "Solder-Filling of A CICC Cable for the EFDA Dipole Magnet"; AIP Conference Proceedings 986, 151; Jan. 2008; 9 Pages.
Bauer; "Development of HTS Current Leads for the ITER Project"; ITER Technical Report, Report No. ITR-18-001; Feb. 28, 2018; 47 Pages.
Bradford et al., "Controllable Critical Current Degradation of ReBCO CC by Post-Manufacturing Deoxygenation", Applied Superconductivity Center, Florida State University, Published Sep. 2019; 21 Pages.
Bruzzone; "Selected Results of Conductor R&D from the Sultan Test Facility"; Progress in Electromagnetic Research Symposium 2004; Pisa, Italy; Mar. 28-31, 2004; 4 Pages.
Celentano, et al.; "Design of an Industrially Feasible Twisted-Stack HTS Cable-in-Conduit Conductor for Fusion Application"; IEEE Transactions on Applied Superconductivity; vol. 23; No. 3; Jul. 2014; 5 Pages.
Collings, et al.; "Bi:2212/Ag-based Rutherford cables: production, processing and properties"; Superconductor Science and Technology; vol. 12; No. 2; Feb. 1, 1999; 3 Pages.
Dietderich, et al.; "Critical Current Variation as a Function of Transverse Stress of Bi-2212 Rutherford Cables"; IEEE Transactions on Applied Superconductivity; vol. 11; No. 1; Mar. 2001; 3 Pages.
Japanese Request of Examination and Voluntary Amendment with amended claims (with English translation) dated Dec. 15, 2022 for Japanese Application No. 2021-534337; 10 Pages.
Fietz, et al.; "High Current HTS Cables—Status and Actual Development"; IEEE/CSC & ESAS Superconductivity News Forum (global edition); Oct. 18-23, 2015; 43 Pages.
Goldacker, et al.; "Roebel cables from REBCO coated conductors: a one-century-old concept for the superconductivity of the future"; Superconductor Science and Technology; Aug. 13, 2014; 17 Pages.
Goldacker, et al.; Improvement of Superconducting properties in ROEBEL Assembled Coated Conductors (RACC); IEEE Transactions on Applied Superconductivity; vol. 19; No. 3; Jun. 2009; 4 Pages.
Indium Corporation; Data sheet 5RMA-RC and 5RA-RC; Jan. 2019; 8 Pages.
Kario, et al. "Investigation of a Rutherford Cable Using Coasted Conductor Roebel Cables as Strands"; Superconductor Science Technology 26 (2013) 085019 (6pp); http://iopscience.jop.org/0953-2048/26/8/085019; Published on Jul. 4, 2013; 7 Pages.
Li, et al.; "Feasibility Study of the Impregnation of a No-Insulation HTS Coil Using Solder"; IEEE Transactions on Applied Superconductivity; vol. 28, No. 1; Jan. 2018; 5 Pages.
Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.
Mei, et al.; "Effects of Cooling Rate on Mechanical Properties of Near-Eutectic Tin-Lead Solder Joints"; Journal of Electronic Materials; vol. 20, No. 8; Feb. 15, 1991; 10 Pages.
Mogro-Campero, et al.; "Degradation of Thin Films of YBa2Cu307 by Annealing in Air and in Vacuum"; Journal of Superconductivity; vol. 8; No. 1; Jan. 1995; 4 Pages.
Markiewicz, et al.; "900 MHz Wide Bore NMR Spectrometer Magnet at NHMFL"; IEEE Transactions on Applied Superconductivity; vol. 10, No. 1; Mar. 2000; 4 Pages.
Nishijima et al., "Mechanical and Transport Characteristic Exploration for Coated Conductors by Hoop Stress Tests;" Physica C.; May 18, 2011; vol. 471, No. 21; 5 Pages.
Office Action dated Aug. 17, 2022 for U.S. Appl. No. 17/291,120; 7 Pages.
Patil, et al.; "Causes of Casting Defects with Remedies"; International Journal of Engineering Research & Technology (IJERT); vol. 4, Issue 11; Nov. 2015; 6 Pages.
PCT International Search Report and Written Opinion of the ISA dated Jun. 25, 2021 for International Application No. PCT/US2021/020916; 15 Pages.
PCT International Preliminary Report on Patentability dated May 27, 2022 for International Application No. PCT/US2020/060170; 12 Pages.
PCT International Preliminary Report on Patentability dated Sep. 15, 2022 for International Application No. PCT/US2021/020916; 8 Pages.
PCT International Search Report and Written Opinion dated Jun. 25, 2021 for International Application No. PCT/US2021/024160; 14 Pages.
PCT International Preliminary Report on Patentability dated Oct. 6, 2022 for International Application No. PCT/US2021/024160; 8 Pages.
PCT International Search Report and Written Opinion dated Feb. 1, 2022 for International Application No. PCT/US2021/30207; 13 Pages.
PCT International Preliminary Report on Patentability dated Nov. 17, 2022 for International Application No. PCT/US2021/030207; 10 Pages.
PCT International Preliminary Report dated Mar. 25, 2021 for International Application No. PCT/US2021/024079; 11 Pages.
International Preliminary Report on Patentability dated Jan. 5, 2023 for International Application No. PCT/US2021/031699; 10 Pages.

(56) References Cited

OTHER PUBLICATIONS

PCT International Preliminary Report on Patentability dated Dec. 1, 2022 for International Application No. PCT/US2021/018962; 11 Pages.
International Search Report and Written Opinion of the ISA dated Jan. 26, 2022 for International Application No. PCT/US2021/020225; 15 Pages.
International Patent Cooperation Treaty PCT Third Party Observation dated Jul. 7, 2022 for International Application No. PCT/US2021/020225; 4 Pages.
International Communication in Cases for Which No Other Form Is Applicable dated Jul. 7, 2022 for International Application No. PCT/US2021/020225; NPL References; 15 Pages.
Pierro, et al.; "Finite element investigation of the mechanical behaviour of a Twisted Stacked-Tape Cable exposed to large Lorentz loads"; IOP Conf. Series: Material Science and Engineering 279; Jan. 2017; 9 Pages.
Prasad, et al.; "Fabrication of New Joints for SST-1 TF Coil Winding Packs"; Fusion Engineering and Design; www.elsevier.com/locate/fusengdes; Jun. 2013; 5 Pages.
Preuss, et al.; "Critical Current Degradation of Coated Conductors Under Soldering Conditions"; IEEE Transactions on Applied Superconductivity; vol. 28; No. 4; Jun. 2018; 5 Pages.
Restriction Requirement dated Jun. 15, 2022 for U.S. Appl. No. 17/291,120; 7 Pages.
Response to Restriction Requirement dated Jun. 15, 2022 for U.S. Appl. No. 17/291,120, filed Aug. 1, 2022; 1 Page.
Response to Office Action dated Aug. 17, 2022 for U.S. Appl. No. 17/291,120, filed Nov. 17, 2022; 16 Pages.
Search Report and Written Opinion of the ISA for International Application No. PCT/US2020/060170 dated Feb. 16, 2021; 20 Pages.
Sumption, et al.; "Measurements of RRR Variation in Strands Extracted From Nb3Sn-Type Rutherford Cables"; AIP Conference Proceedings 986,277; Mar. 4, 2008; 10 Pages.
Ta, et al.; "Comparison study of cable geometries and superconducting tape layouts for high-temperature superconductor cables"; Cryogenics; Mar. 1, 2018; 7 Pages.
Takayasu, et al.; "Present Status and Recent Developments of the Twisted Stacked-Tape Cable Conductor"; IEEE Transactions on Applied Superconductivity; vol. 26; No. 2; Mar. 2016; 10 Pages.
Tsui, et al.; "Soldered Joints—An Essential Component of Demountable High Temperature Superconducting Fusion Magnets"; IOP Publishing, Superconductor Science and Technology; vol. 29, Jan. 2016; 16 Pages.
Uglietti; "A review of commercial high temperature superconducting material for large magnets: from wires and tapes to cables and conductors"; Superconductor Science and Technology; Jan. 2019; 30 Pages.
Uglietti, et al.; "Critical currents versus applied strain for industrial Y-123 coated conductors at various temperatures and magnetic fields up to 19 T", Supercond. Sci. Technol. 19; pp. 869-872; Jul. 5, 2006; 5 Pages.
Van der Laan, et al.; Characterization of a high-temperature superconducting conductor on round core cables in magnetic fields up tp 20 T; Superconductor Science and Technology 26; Feb. 13, 2013; 10 Pages.
Whyte, et al.; "Smaller & Sooner: Exploiting High Magnetic Fields from New Superconductors for a More Attractive Fusion Energy Development Path"; J Fusion Energ (2016) 35:41-53; Jan. 22, 2016; 13 Pages.
Anwar, et al.; "Direct Penetration of Spin-Triplet Superconductivity into a Ferromagnet in Au/$SrRuO_3$/$Sr_2RuO_4$ Junctions"; Nature Communications; 7:13220; Oct. 26, 2016; pp. 1-7; 7 Pages.
Choi, et al.; "A novel no-insulation winding technique of high temperature-superconducting racetrack coil for rotating applications: A progress report in Korea university"; Review of Scientific Instruments 87; 104704; American Institute of Physics; Oct. 7, 2016; 12 Pages.
Hahn, et al.; "No-insulation multi-width winding technique for high temperature superconducting magnet"; Applied Physics Letters 103, 173511; American Institute of Physics; Oct. 23, 2013; 3 Pages.
Response to Non-Final Office Action dated Mar. 17, 2020 for U.S. Appl. No. 15/710,895, filed Jun. 17, 2020; 8 Pages.
U.S. Final Office Action dated Feb. 4, 2021 for U.S. Appl. No. 16/959,600; 15 Pages.
Response to U.S. Non-Final Office Action dated Dec. 14, 2021 for U.S. Appl. No. 17/345,194, filed Mar. 7, 2022; 12 Pages.
Response filed on May 2, 2023 for European Application No. 21719448.9; 28 Pages.
Korean Office Action dated Nov. 2, 2022 for Korean Application No. 10-2021-7021732; 16 Pages.
Korean Amendment with Pending Claims (with English Translation) dated Dec. 29, 2022 for Korean Application No. 10-2021-7021732; 65 Pages.
Korean Final Notice of Preliminary Rejection dated Jan. 10, 2023 for Korean Application No. 10-2021-7021732; 6 Pages.
Korean Notice of Allowance with Allowed Claims in English dated Mar. 21, 2023 for Korean Application No. 10-2021-7021732; 15 Pages.
Examination Report dated May 10, 2023 for European Application No. 19843007.6; 8 Pages.
Response filed on May 8, 2023 for European Application No. 21719774.8; 13 Pages.
Response filed on Jul. 2, 2023 for European Application No. 21732726.1; 11 Pages.
Notice of Allowance dated Jun. 30, 2023 for U.S. Appl. No. 17/810,038; 22 Pages.
U.S. Appl. No. 17/810,038, filed Jun. 30, 2022, Labombard et al.
Communication Pursuant to Rules 161(1) and 162 EPC for European Application No. 19843007.6 dated Aug. 3, 2021; 3 Pages.
Final Office Action dated Feb. 4, 2021 for U.S. Appl. No. 16/959,600; 15 Pages.
Fangliang Dong et al.; "An on-board 2G HTS magnets system with cooling-power-free and persistent-current operation for ultrahigh speed superconducting maglevs"; Scientific Reports Nature Search, Aug. 19, 2019, 12 pages.
International Preliminary Report on Patentability dated Jul. 1, 2021 for International Application No. PCT/US2019/067116; 11 Pages.
International Preliminary Report on Patentability dated Jul. 8, 2021 for International Patent Application No. PCT/US2019/068332; 16 Pages.
Kim, et al.; "Investigation on quench initiation and propagation characteristics of GdBCO coil co-wound with a stainless-steel tape as turn-to-turn metallic insulation"; Review of Scientific Instruments 87; 114701; American Institute of Physics; Nov. 2, 2016; 6 Pages.
Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; Part 1; 29 pages.
Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; Part 2; 30 pages.
Minervini, et al.; "Superconducting Magnets Research for a Viable US Fusion Program"; https://fire.pppl.gov/SC_Magnet_Research_White_Paper.pdf; Publication date unknown; Downloaded on Dec. 1, 2018; pp. 1-11; 11 Pages.
Notice of Allowance dated Jun. 30, 2017 for U.S. Appl. No. 15/090,847; 13 Pages.
Notice of Allowance dated Jul. 1, 2020 for U.S. Appl. No. 15/710,895; 9 Pages.
Notice of Allowance dated May 12, 2021 for U.S. Appl. No. 16/959,600; 10 Pages.
Notice of Allowance dated May 25, 2022 for U.S. Appl. No. 17/345,194; 4 Pages.
Office Action dated Jan. 26, 2017 for U.S. Appl. No. 15/090,847; 7 Pages.
Office Action dated Mar. 17, 2020 for U.S. Appl. No. 15/710,895; 9 pages.

(56) References Cited

OTHER PUBLICATIONS

Office Action dated Oct. 20, 2020 for U.S. Appl. No. 16/959,600; 16 Pages.
Office Action dated Oct. 20, 2020 for U.S. Appl. No. 16/233,410; 20 Pages.
Office Action dated Oct. 20, 2020 for U.S. Appl. No. 16/416,781; 17 Pages.
Office Action dated Oct. 26, 2021 for U.S. Appl. No. 17/345,194; 16 Pages.
Office Action dated Dec. 14, 2021 for U.S. Appl. No. 17/345,194; 11 Pages.
PCT International Search Report and Written Opinion dated Mar. 31, 2020 for International Application No. PCT/US2019/068332; 20 Pages.
PCT International Search Report and Written Opinion dated Jun. 9, 2021 for International Application No. PCT/US2021/018962; 17 Pages.
PCT International Search Report and Written Opinion dated Dec. 10, 2021 for International Application No. PCT/US2021/03349; 80 Pages.
PCT International Search Report and Written Opinion dated Jan. 7, 2022 for International Application No. PCT/US2021/031699; 16 Pages.
Piec, et al.; "Development of a High-Field, Non-Insulated, High Temperature Superconducting Magnet for Fusion Research and Other Applications"; https://magneticsmag.com/development-of-a-high-field-non-insulated-high-temperature-superconducting-magnet-for-fusion-research-and-other-applications/; Apr. 29, 2020; 5 pages.
Response to Office Action dated Jan. 26, 2017 for U.S. Appl. No. 15/090,847, filed May 25, 2017; 6 Pages.
Response to Final Office Action dated Oct. 25, 2019 for U.S. Appl. No. 15/710,895, filed Jan. 27, 2020; 6 pages.
Response to Office Action dated Mar. 17, 2020 for U.S. Appl. No. 15/710,895, filed Jun. 17, 2020; 8 Pages.
Response to Office Action dated Oct. 20, 2020 for U.S. Appl. No. 16/959,600, filed Jan. 20, 2021; 13 Pages.
Response to Final Office Action dated Feb. 4, 2021 for U.S. Appl. No. 16/959,600, filed May 3, 2021; 10 Pages.
Response to Rule 161/162 Communication dated Aug. 3, 2021 for European Application No. 19843007.6; Response filed on Jan. 27, 2021; 7 Pages.
Response to Office Action dated Dec. 14, 2021 for U.S. Appl. No. 17/345,194, filed Mar. 7, 2022; 12 Pages.
Semba, et al.; "Design and Manufacture of Superconducting Magnet for the Wiggler in Saga-LS"; Proceedings of IPAC'10, Kyoto, Japan; MOPEBO38; May 23, 2010; pp. 358-360; 3 Pages.
Takayasu, et al.; "Conductor Characterization of YBCO Twisted Stacked-Tape Cables"; IEEE Transactions on Applied Superconductivity; vol. 23; No. 3; Jun. 2013; 4 Pages.
Yanagi, et al.; "Feasibility of HTS Magnet Option for Fusion Reactors"; Plasma and Fusion Research: Regular Articles; vol. 9; Jan. 2014; 6 Pages.
Yanagi, et al.; "Progress of the Design of HTS Magnet Option and R&D Activities for the Helical Fusion Reactor"; IEEE Transactions on Applied Superconductivity; vol. 24; No. 3; Jun. 2014; 5 Pages.
Yazaki et al. "Critical Current Degradation in High-Temperature Superconducting Tapes Caused by Temperature Rise", IEEE Transaction on Applied Superconductivity, vol. 23, No. 3, Published Jun. 2013; 4 Pages.
Canadian Office Action dated Jan. 9, 2025 for Canadian Patent Application No. 3,122,318; 4 pages.
Response to Japanese Office Action (with English translation) dated Dec. 3, 2024 for Japanese Patent Application No. 2024-064599; Response filed on Jan. 15, 2025; 15 pages.
Japanese Decision to Grant Patent (with English translation) dated Jan. 21, 2025 for Japanese Patent Application No. 2024-064599; 9 pages.
Korean Notice of Allowance (with English translation) dated Jan. 24, 2025 for Korean Patent Application No. 10-2023-7020578; 9 pages.
Japanese Office Action (with English translation) dated Jan. 22, 2025 for Japanese Patent Application No. 2022-579656; 11 pages.
Korean Office Action (with English translation) dated Jan. 8, 2025 for Korean Patent Application No. 10-2022-7045023; 14 pages.
Response to Japanese Office Action (with English translation) dated Oct. 23, 2024 for Japanese Patent Application No. 2022-570130; Response filed Jan. 22, 2025; 21 pages.
Japanese Decision to Grant Patent (with English translation) dated Jan. 24, 2025 for Japanese Patent Application No. 2022-570130; 13 pages.
Japanese Office Action (with English machine translation) dated Jan. 30, 2025 for Japanese Patent Application No. 2022-557716; 10 pages.
Korean Office Action (with English translation) dated Jan. 2, 2025 for Korean Patent Application No 10-2022-7036137; 14 pages.
Response to European Communication under Rule 71(3) dated Oct. 9, 2024 for European Patent Application No. 21719448.9; Response filed Feb. 7, 2025; 8 pages.
Korean Office Action (with English translation) dated Jan. 2, 2025 for Korean Patent Application No. 10-2022-7037032; 14 pages.
Xi et al., "Influence of External Magnetic Field on the Critical Current of a Novel HTS Square Wire"; 2018 IEEE International Conference on Applied Superconductivity and Electromagnetic Devices; Apr. 15-18, 2018; 2 pages.
Yanagi et al., "Feasibility of HTS Magnet Option for Fusion Reactors"; The Japan Society of Plasma Science and Nuclear Fusion Research; vol. 9; Aug. 2014; 6 pages.
Japanese Response (with Machine Translation from Espacenet.com) to Office Action dated Oct. 18, 2023 for Japanese Application No. 2021-534337; Response filed Jan. 17, 2024; 16 Pages.
Japanese Notice of Allowance (with English Translation) dated Apr. 1, 2024 for Japanese Application No. 2021-534337; 9 Pages.
Response to European Communication dated Nov. 27, 2023 for European Application No. 21719448.9; Response filed Mar. 25, 2024; 31 Pages.
PCT International Search Report and Written Opinion dated Apr. 8, 2024 for International Application No. PCT/US2023/083812; 12 Pages.
Response to Korean Office Action (with English Translation) dated Jan. 8, 2025 for Korean Application No. 10-2022-7045023, Response Filed Apr. 1, 2025, 60 Pages.
Response to Japanese Office Action (with English Translation of Claims) dated Jan. 17, 2025 for Japanese Application No. 2022-579656, Response Filed Apr. 17, 2025, 12 Pages.
Korean Office Action (with English Translation) dated Mar. 4, 2025 for Korean Application No. 10-2022-7043520; 18 Pages.
Response to Korean Office Action (with English Translation) dated Jan. 2, 2025 for Korean Application No. 10-2022-7036137, Response Filed Apr. 2, 2025, 34 Pages.
Response to Japanese Office Action (with English Translation) dated Jan. 30, 2025 for Japanese Application No. 2022-557716, Response Filed May 27, 2025, 10 Pages.
European Intention to Grant dated Mar. 27, 2025 for European Application No. 21719448.9; 9 Pages.
Response to Korean Office Action (with English Translation) dated Jan. 2, 2025 for Korean Application No. 10-2022-7037032; Response Filed Apr. 2, 2025, 57 Pages.
Japanese Office Action (with English Translation) dated Apr. 23, 2025 for Japanese Application No. 2022-557713; 6 Pages.
Restriction Requirement dated May 22, 2025 for U.S. Appl. No. 17/919,942; 6 Pages.
Li, et al.; "Development of a Novel Soldered-Stacked-Square (3S) HTS Wire Using 2G Narrow Tapes With 1 mm Width"; IEEE Transactions on Applied Superconductivity; vol. 27, No. 4; Jun. 2017; 4 Pages.
Xi, et al.; "Influence of External Magnetic Field on the Critical Current of a Novel HTS Square Wire"; Proceedings of 2018 IEEE International Conference on Applied Superconductivity and Electromagnetic Devices; Apr. 2018; 2 Pages.
Yanagi, et al.; "Feasibility of HTS Magnet Option for Fusion Reactors"; Plasma and Fusion Research: Regular Articles; vol. 9, No. 1405013; Jan. 1, 2014; 6 Pages.

(56) References Cited

OTHER PUBLICATIONS

European Examination Report dated May 14, 2024 for European Application No. 21719774.8, 9 pages.
Notice of Allowance dated May 23, 2024 for U.S. Appl. No. 18/476,886, 9 pages.
Intention of grant dated May 24, 2024 for European Application No. 19843007.6, 10 pages.
PCT International Search Report and Written Opinion dated Jun. 5, 2024 for International Patent Application No. PCT/US2024/013492; 14 pages.
Gade, "Conceptual Design of High Temperature Superconducting Toroidal Field Coils for Future Fusion Power Plants;" Dissertation from Karlsruher Institute fur Technologie (KIT); Jan. 1, 2019; 152 Pages.
Mangiarotti, "Design of Demountable Toroidal Field Coils with REBCO Superconductors for a Fusion Reactor;" Partial Fulfillment of the Requirements for the Degree of Doctor of Philosophy in Nuclear Science and Engineering at MIT; Feb. 2016; 145 Pages.
Response to European Communication Under Rule 71(3) dated May 24, 2024 for European Application No. 19843007.6; Response Filed Sep. 24, 2024; 13 Pages.
European Examination Report dated Oct. 18, 2024 for European Application No. 21811542.6; 9 Pages.
European Examination Report dated Aug. 12, 2024 for European Application No. 21732726.1; 5 Pages.
Japanese Examination Report (with Machine English Translation from Espacenet.com) dated Oct. 21, 2024 for Japanese Application No. 2022-570130; 12 Pages.
U.S. Restriction Requirement dated Sep. 23, 2024 for U.S. Appl. No. 17/919,606; 6 Pages.
Response to European Examination Report dated May 14, 2024 for European Application No. 21719774.8; Response Filed Sep. 12, 2024; 12 Pages.
European Intention to Grant dated Oct. 9, 2024 for European Application No. 21719448.9; 12 Pages.
PCT International Search Report and Written Opinion dated Feb. 29, 2024 for International Application No. PCT/US2023/081302; 19 Pages.
U.S. 3rd Notice of Allowance dated Jan. 2, 2025 for U.S. Appl. No. 18/476,886; 8 Pages.
European Intention to Grant (with Allowed Claims) dated Oct. 25, 2024 for European Application No. 19843007.6; 13 Pages.
PCT International Search Report and Written Opinion dated Mar. 11, 2024 for International Patent Application No. PCT/US2023/081450; 23 pages.
Office Action dated Mar. 22, 2024 for Korean Application No. 10-2023-7020578 with English Translation; 9 Pages.
U.S. Notice of Allowance dated Aug. 28, 2024 for U.S. Appl. No. 18/476,886; 8 Pages.
Response (with English Translation) to Korean Office Action dated Mar. 22, 2024 for Korean Application No. 10-2023-7020578; Response Filed Jul. 19, 2024; 16 Pages.
Response to European Official Communication dated Aug. 12, 2024 for European Application No. 21732726.1; Response Filed Dec. 2, 2024; 19 Pages.
Extended European Search Report dated Dec. 4, 2024 for European Application No. 24200938.9; 10 Pages.
Japanese Office Action (with Machine English Translation) dated Nov. 28, 2024 for Japanese Application No. 2024-64599; 6 Pages.
Examination Report Dated Nov. 27, 2023 for Application No. 21719448.9; 4 Pages.
Response to Examination Report dated Feb. 2, 2023 for European Application No. 21811542.6 as filed on Aug. 9, 2023; 15 Pages.
Response to Examination Report dated May 10, 2023 for European Application No. 19843007.6 as filed on Sep. 6, 2023; 24 Pages.
Response filed Jan. 6, 2026, for European Application No. 23837033.2; 21 pages.
Response filed Sep. 24, 2024, for European Application No. 19843007.6; 10 pages.
Intention to Grant issued Oct. 25, 2024, for European Application No. 19843007.6; 10 pages.
Examination Report dated Nov. 25, 2025, for Canadian Application No. 3, 122,318; 5 pages.
Response to Office Action dated Aug. 12, 2025, for U.S. Appl. No. 17/913,609; Response filed Dec. 12, 2025; 11 pages.
Communication Pursuant to Article 94(3) EPC dated Jan. 2, 2026, for European Application No. 21719774.8; 10 pages.
Response to Rules 161(1) and 162 EPC filed on Jan. 23, 2026, for European Application No. 23833278.7; 24 pages.
Response to Rules 161(1) EPC filed on Jan. 22, 2026, for European Application No. 23847922.4; 16 pages.
Final Office Action dated May 20, 2025 for Korean Application No. 10-2022-7045023 with translation; 10 pages.
Notice of Allowance dated Oct. 15, 2025 for Korean Application No. 10-2022-7045023 with translation; 13 pages.
Office Action dated Jan. 22, 2025 for Japanese Application No. 2022-579656 with translation; 11 Pages.
Response to Examination Report dated Oct. 18, 2024 for European Application No. 21811542.6 as filed on Apr. 7, 2025; 11 Pages.
Response to Office Action dated Jan. 22, 2025 for Japanese Application No. 2022-579656 with translation filed on Apr. 17, 2025; 10 Pages.
Response to Final Office dated May 20, 2025 for Korean Application No. 10-2022-7045023 as filed on Sep. 18, 2025 with translation; 26 pages.
Response to Office Action dated Aug. 7, 2025 for U.S. Appl. No. 17/919,942 as filed on Nov. 7, 2025; 17 Pages.
Office Action dated Oct. 23, 2024 for Japanese Application No. 2022-570130 with English Translation; 13 Pages.
Office Action dated Mar. 5, 2025 for Japanese Application No. 2025-025739 with English Translation; 6 Pages.
Response to Office Action dated Mar. 5, 2025 for Japanese Application No. 2025-025739 with English Translation as filed on Apr. 3, 2025; 9 Pages.
Notice of Allowance dated Apr. 9, 2025 for Japanese Application No. 2025-025739 with English Translation; 6 Pages.
Response to Office Action dated Jan. 9, 2025 for Canadian Application No. 3122318 as filed on May 9, 2025; 28 Pages.
Notice of Allowance dated Jun. 12, 2025 for Korean Application No. 10-2022-7043520 with English Translation; 6 Pages.
Response to Communication issued pursuant to Rule 69 EPC for Application No. 24200938.9 as filed on May 26, 2025; 34 Pages.
Office Action dated Aug. 7, 2025 for U.S. Appl. No. 17/919,606; 10 Pages.
Response for Office Action dated Aug. 7, 2025 for U.S. Appl. No. 17/919,606, filed Oct. 8, 2025; 13 Pages.
Response to Rule 112(1) Communication dated Mar. 17, 2025 for European Application No. 23705911.8; as filed on Apr. 16, 2025; 15 Pages.
Examination Report dated Sep. 29, 2025 for European Application No. 23705911.8; 5 Pages.
Notice of Allowance dated Dec. 12, 2025 for U.S. Appl. No. 17/919,606; 15 Pages.
Alam "Development of high strength Sn—CU solder using copper particles at nanolength scale"; Journal of alloys and Compounds 476 (2009); Oct. 31, 2008; 8 pages.
Non Final Office Action dated Aug. 7, 2025 for U.S. Appl. No. 17/919,606; 37 Pages.
Non Final Office Action dated Aug. 12, 2022 for U.S. Appl. No. 17/913,609; 52 Pages.
Non Final Office Action dated Aug. 7, 2025 for U.S. Appl. No. 17/919,942; 34 Pages.
Response to Restriction Requirement dated May 22, 2025 for U.S. Appl. No. 17/919,942 Response filed Jul. 28, 2025; 9 Pages.
Japanese Notice of Allowance (with English Translation) dated Jul. 2, 2025 for Japanese Application No. 2022-579656; 8 Pages.
Response to Japanese Office Action (with English Translation) dated Apr. 18, 2025 for Japanese Application No. 2022-557713, Response Filed Jul. 23, 2025, 17 Pages.

(56) References Cited

OTHER PUBLICATIONS

PCT International Preliminary Report on Patentability dated Jun. 12, 2025 for International Application No. PCT/US2023/081302; 13 Pages.

* cited by examiner

CONDUCTOR AND COOLANT SCHEMES FOR SPIRAL-GROOVED, STACKED PLATE, NON-INSULATED SUPERCONDUCTING MAGNETS

CROSS REFERENCE TO RELATED APPLICATIONS

This application is a National Stage Entry of International Application PCT/US2021/024160, filed Mar. 25, 2021, which claims the benefit of U.S. Provisional Application 63/000,393, filed on Mar. 26, 2020, and U.S. Provisional Application 63/027,540, filed on May 20, 2020. The entire contents of these applications are incorporated herein by reference.

BACKGROUND

Superconductors are materials that have no electrical resistance to current (are "superconducting") below some critical temperature. For many superconductors, the critical temperature is below 30 K, such that operation of these materials in a superconducting state requires significant cooling, such as with liquid helium or supercritical helium.

High-field magnets are often constructed from superconductors due to the capability of superconductors to carry a high current without resistance. Such magnets may, for instance, carry currents greater than 5 kA.

SUMMARY

According to some aspects, a magnet is provided comprising a plurality of plates arranged in a stack that includes a first plate, the first plate comprising a conducting channel on a first side of the first plate, at least part of the conducting channel being arranged in a spiral path, the conducting channel comprising a high temperature superconductor (HTS) material and a conductive material, and a plurality of cooling channels on a second side of the first plate, the second side opposing the first side.

According to some aspects, a magnet is provided comprising a plurality of plates arranged in a stack that includes a first plate, the first plate comprising a conducting channel on a first side of the first plate, at least part of the conducting channel being arranged in a spiral path, the conducting channel comprising a high temperature superconductor (HTS) material and a conductive material, and a plurality of cooling channels formed by concave regions of the HTS material and/or conductive material within the conducting channel.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
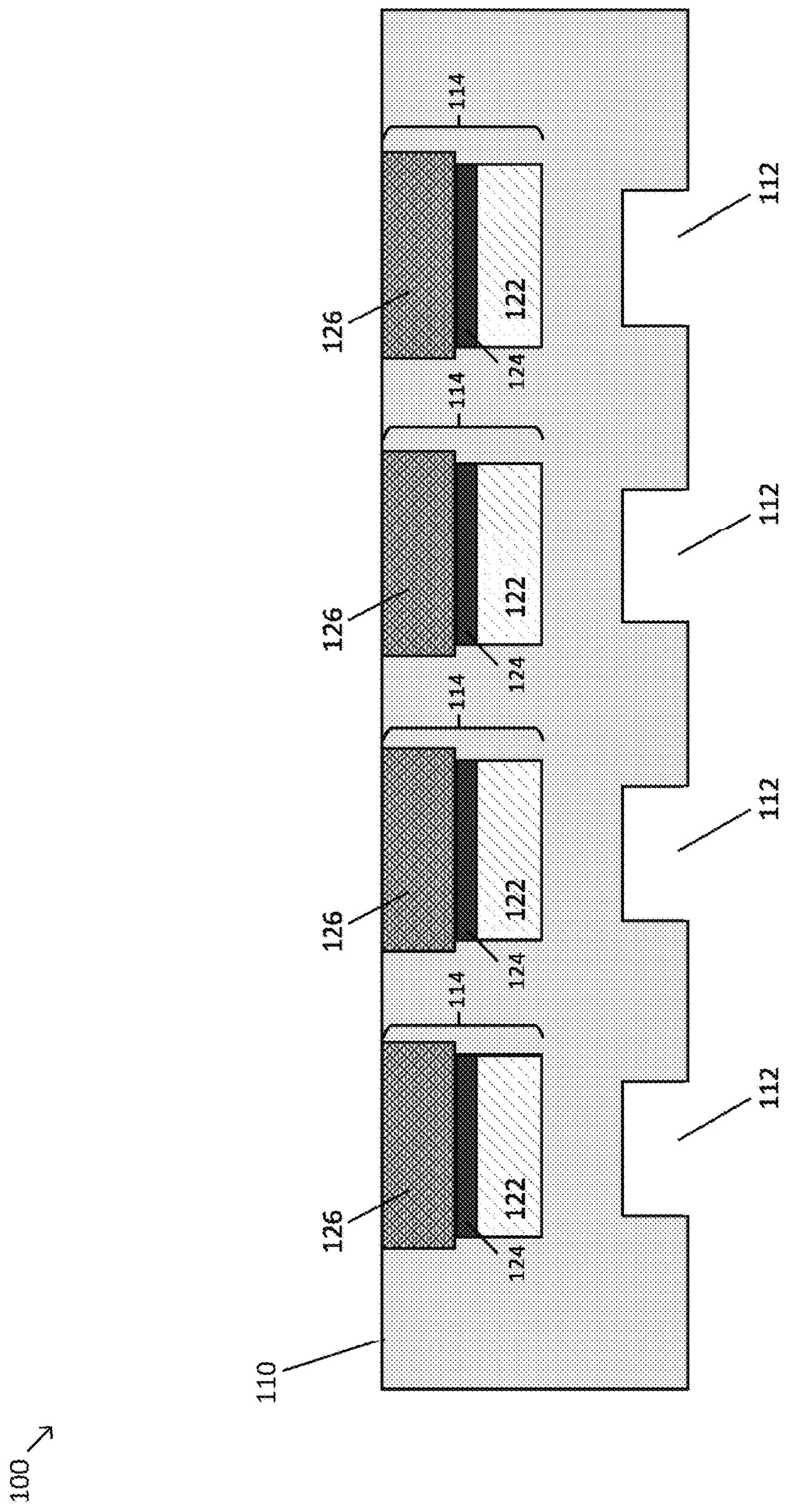
FIG. 1 is a cross-sectional view of a portion of an illustrative plate suitable for use in a stacked-plate superconducting magnet, according to some embodiments.

A high-field superconducting magnet often comprises multiple electrically insulated cable turns grouped in a multi-layer arrangement. When the superconducting material is cold enough to be below its critical temperature (the temperature below which the electrical resistivity of the material drops to zero), driving the magnet allows current to pass through the superconducting path without losses. However, for various reasons some or all of the superconducting material may be heated to above its critical temperature and therefore lose its superconducting characteristics. If uncontrolled, such heating can lead to the superconductor losing its superconducting abilities, often referred to as a "quench." Moreover, if the quench is not properly addressed by the system (e.g., by shutting down), components can be damaged by the heating.

Some superconducting magnet systems handle quench events via a system of active alarms and detection mechanisms. Other superconducting magnet systems handle quenches passively through design of the superconducting magnet itself. An example of the latter approach is a non-insulated (NI) magnet (also referred to as a no-insulation (NI) magnet), in which adjacent superconducting turns of the magnet are not insulated from one another but are instead separated by a conventional conductor (i.e., not a superconductor). When the magnet is operating below the superconductor's critical temperature, current flows through the superconductor and not across turns because the superconductor has zero resistance compared with the finite resistance of the conductor that lies between the turns.

During a quench, however, at least one or more portions of the superconductor may be in a "normal" (non-superconducting) state (i.e., at least one or more portions of the superconductor have a finite resistance rather than a zero resistance which is characteristic of a superconductor). The at least one or more portions of the superconductor having a normal resistance are sometimes referred to as "normal zones" of the superconductor. When normal zones appear, at least some zero resistance current pathways are no longer present, causing the current to flow through the normal zones and/or between the turns, with the balance of current flow between these pathways depending on their relative resistances. By diverting at least some current from the superconducting material when it is normal in this manner, therefore, NI magnets, and in particular non-insulated high temperature superconductor (NI-HTS) magnets (NI magnets that comprise HTS), can in principle be passively protected against quench damage without the need to continuously monitor quench events and/or to actively engage external quench protection mechanisms.

The inventors have recognized and appreciated a non-insulated superconducting magnet design that comprises a stack of conductive plates that each include a spiral groove. A superconductor can be arranged within the grooves and the plates stacked such that the superconductor forms a continuous current path through the plates, making a spiral path within each plate. The conductive plates act as the conductive material that is arranged between the turns of the superconducting magnet in the NI design discussed above. The spiral-grooved, stacked-plate design has the advantage that it is scalable to large bore magnets, and can be configured to have a high overall current density, be thermally stable, and mechanically stable.

As the size of NI magnets constructed using the spiral-grooved, stacked-plate design increase, however, there is a concomitant increase of the Lorentz loads on various regions of the conductor. Such increased Lorentz loads may lead to reduced structural integrity of the NI magnet. Moreover, the amount of internal volumetric heating may also increase as the magnets become larger. These conditions thereby require further consideration as to how cooling and conductive paths are arranged within a spiral-grooved, stacked-plate NI magnet design.

The inventors have recognized and appreciated schemes for conductor and coolant placement in stacked-plate superconducting magnets. In particular, the inventors have recognized that there are advantages to arranging coolant channels and conducting channels within the plates on opposing faces. If the two types of channels are aligned with one another across the plate stacks, the plates may be stacked such that the cooling channel in one plate is adjacent to the conducting channel of the neighboring plate. By stacking a number of these plates, therefore, cooling may be supplied to each conducting channel through the cooling channels of each neighboring plate. Moreover, by aligning the two types of channels, the stacks of plates may have improved mechanical strength because mechanical load paths may be created through the entire stack that do not pass through any of the channels. If the plates are also formed from (e.g., via traditional machining processes, via additive and/or subtractive processes, etc.) an appropriately strong material, this arrangement of channels may produce a very strong stack of plates that can withstand high Lorentz loads.

One benefit of this design is that cryogenic coolant may make direct contact with material in the conducting channel (which may be, or may include, the superconducting material) along a substantial length of the conducting channel, because the two types of channel are aligned as such. Very efficient cooling can therefore be delivered to the superconducting material in the magnet. Moreover, no dedicated cooling plates are needed, because all of the cooling necessary may be included within the same plates that house the superconductors.

According to some embodiments, the conducting channels of the plates may comprise an HTS superconductor electrically coupled to a second conductor, such as copper. The second conductor may be aligned with the opening of the conducting channel—for instance, the second conductor may have a surface that is flush with the face of the plate in which the conducting channel is arranged. In this case, the HTS superconductor is embedded within the channel beneath the second conductor. In some embodiments, the conducting channels may comprise a third conductor, such as a Pb or Sn solder, which fills the space in the channel other than the second conductor and the HTS superconductor. In some cases, the third conductor may electrically couple the HTS superconductor to the second conductor.

According to some embodiments, a stacked-plate superconducting magnet may comprise alternating types of plates within the bulk of the stack of plates. For instance, a first type of plate may include conducting channels that spiral inward, while a second type of plate may include conducting channels that spiral outward. By arranging suitable connection points between the plates, a continuous conductive path through all of the conducting channels may be arranged, while providing cooling throughout the stack of plates. Such a design may also lead to being particularly modular, since aside from possibly the uppermost and/or lowermost plate (e.g., terminal plates), the bulk of the stack of plates may be formed or arranged by alternating placement of the two types of plates.

According to some embodiments, the conducting channel in a stacked-plate superconducting magnet may be arranged in a racetrack spiral (or simply "racetrack pattern"). In a racetrack spiral, the path follows a racetrack shape (e.g., a rectangle with rounded corners) without spiraling inward or outward for most of the circumference, but includes a number of "jogs" or "joggles" in which the path jogs inward or outward. These jogs cause the racetrack spiral to wind inward or outward, depending on the direction of the jogs.

According to some embodiments, electrically insulating material may be arranged between plates of the stack of plates. In some cases, the insulation may cover part of, but not all, of the face of the plate. Conducting pads electrically connecting neighboring plates may, for instance, not have intervening insulating material between the pads. Moreover, at least some portion of the surface area of neighboring plates may contact one another directly, with the majority of the surface area of the contact between the plates being via insulating material. Arranging insulating material in this way may provide a conductive path between plates of the stack while maximizing the length of the conductive path, which may provide beneficial properties during magnet charging and during a quench.

Following below are more detailed descriptions of various concepts related to, and embodiments of, schemes for conductor and coolant placement in stacked-plate superconducting magnets. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a cross-section of a portion of an illustrative plate suitable for use in a stacked-plate superconducting magnet, according to some embodiments. In the example of FIG. 1, plate 100 comprises a baseplate material 110, in which are formed (e.g., via traditional machining processes, via additive and/or subtractive processes, etc.) cooling channels 112 and conducting channels 114. In the conducting channels are arranged an HTS material 122, a cap 126 and an intervening conductive material 124 which provides electrical and thermal contact between the HTS material 122 and cap 126.

It will be appreciated that another portion of plate 100 not shown in FIG. 1 may comprise a "jog" region in which the path of the conductive channel jog outward or inward to move to the next outer or inner racetrack path, respectively. For instance, in the case where the cross-section shown in FIG. 1 represents a portion of a plate in which the conductive channels 114 spiral inward, another portion of the plate may include an inward jog for at least some of the channels to connect the channel to the next innermost channel (e.g., outermost channel to 2nd outermost channel, etc.).

According to some embodiments, cooling channels 112 are open channels within the plate 100. The cooling channels may become closed, thereby allowing cryogens to flow through the channels, by arranging the plate 100 adjacent to another plate, such as another instance of plate 100. For example, when two instances of the plate 100 are stacked on top of one another, the cooling channels 112 may contact the caps 126 around the edges of each cooling channel. As a result, the cryogen flowing through the cooling channel may be in direct contact with the cap 126.

According to some embodiments, the baseplate 110 may comprise, or may consist of, a high mechanical strength material such as but not limited to steel, Inconel®, Nitronic® 40, Nitronic® 50, Incoloy®, or combinations thereof. In some embodiments, the baseplate 110 may be plated with a metal such as nickel to facilitate adhesion of other components to the plate, including solder as described below.

According to some embodiments, the HTS 122 may comprise a rare earth barium copper oxide superconductor (REBCO), such as yttrium barium copper oxide (YBCO). In some embodiments, the HTS 122 may comprise a co-wound stack of HTS tape. In embodiments, the HTS tape may comprise a long, thin strand of HTS material with cross-sectional dimensions in the range of about 0.001 mm to about 0.1 mm in thickness (or height) and a width in the range of about 1 mm to about 12 mm (and with a length that extends along the length of the cable, e.g., into and out of the page in the example of FIG. 1). According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment.

According to some embodiments, cap 126 may comprise, or may consist of, copper. It may be noted that, as a result of the plate 100 being shown in cross-section in FIG. 1, that the shapes of the HTS 122 in the plate 100, and of the cap 126 in the plate 100, are generally that of a spiral (e.g., a racetrack spiral).

According to some embodiments, conductive material 124 may comprise a Pb and/or Sn solder. In some embodiments, conductive material 124 may comprise a metal having a melting point of less than 200° C., wherein at least 50 wt % of the metal is Pb and/or Sn, and at least 0.1 wt % of the metal is Cu.

As shown in FIG. 1, the cap 126 is arranged within an upper section of channels 114 that is wider than the lower section in which the HTS 122 and conductive material 124 are located. In some embodiments, the conductive material 124 may be introduced into the plate 100 as a molten solder subsequent to arranging the HTS 122 and cap 126 within the conducting channel 114. As a result, the conductive material 124 may fill the space between the HTS 122 and cap 126 and/or may fill any space around the sides of the HTS 122 and/or cap 126, should such space be present prior to filling or otherwise occupying the space with the solder.

In some embodiments, the HTS 122 may be pre-tinned with a metal (e.g., a PbSn solder) to promote a good bond between the HTS 122 and the solder. According to some embodiments, the conductive material 124 may be deposited via a vacuum pressure impregnation (VPI) process. Such a process may comprise one or more of the following steps: cleaning the empty space within the cable using an acidic solution following by a water rinse; evacuating the space within the cable; purging the space with an inert gas; depositing flux into the space to coat the HTS 122 and the conductive material 124; draining any excess flux from the cable; heating the cable to a temperature below, at, or above a temperature at which the alloy to be deposited will melt; and flowing a molten alloy (e.g., a PbSn solder) into the plate.

According to some embodiments, plate 100 may comprise one or more through holes (not shown in FIG. 1) for attaching the plate to other plates and/or other structures. In some cases, the through holes may comprise an interior thread to facilitate insertion of mechanical fasteners such as screws or bolts into or through the plate.

In the example of FIG. 1, it will be appreciated that while particular shapes of the channels 112 and 114 are illustrated, the techniques described herein are not limited to channels with these particular shapes. For instance, the channels could have a half-circle cross-section instead of the rectangular cross-section shown, or another other suitable shape cross-section.

Figure 2A:
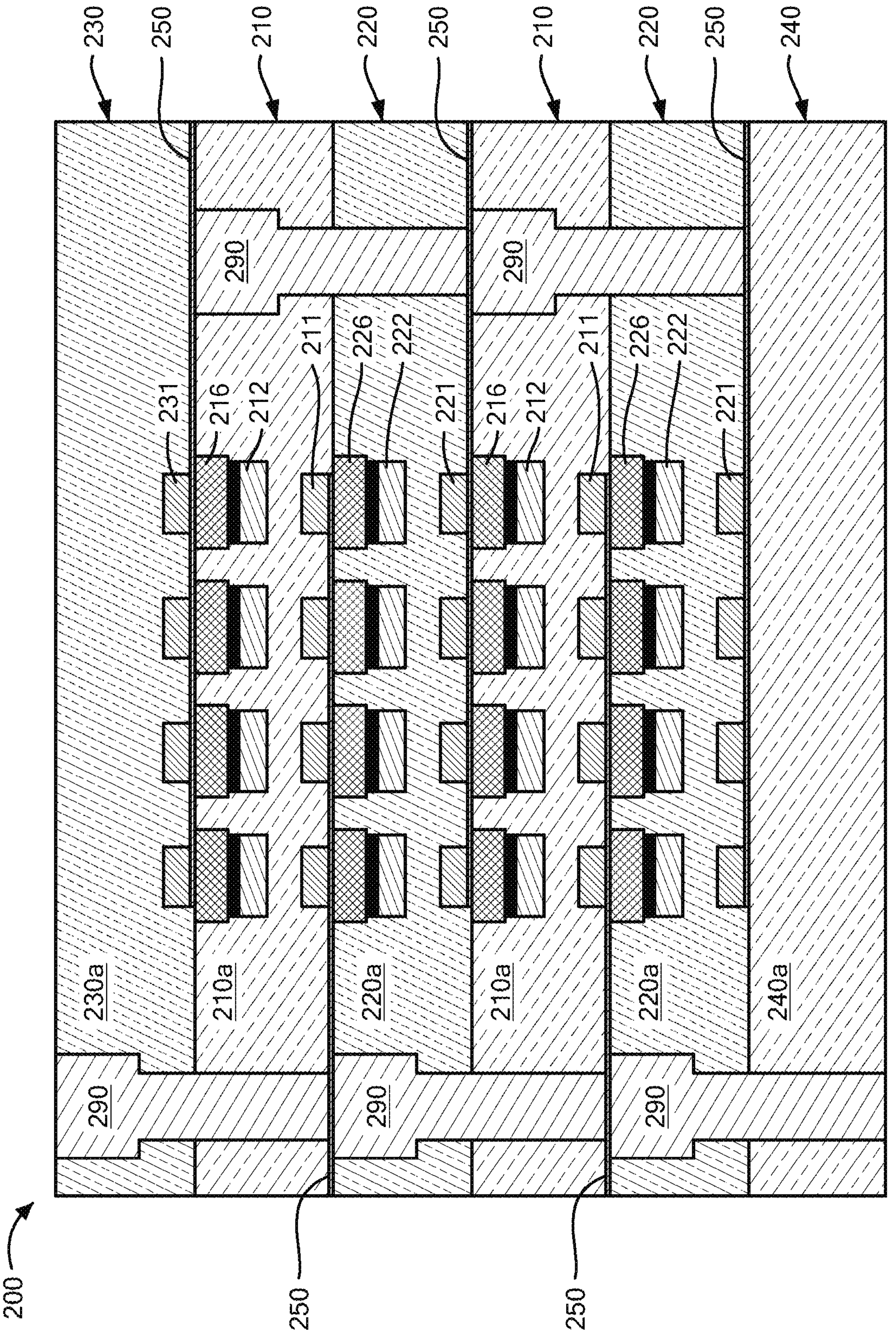
FIGS. 2A-2B show different cross-sections of an illustrative stack of plates in a superconducting magnet, according to some embodiments.
Figure 2B:
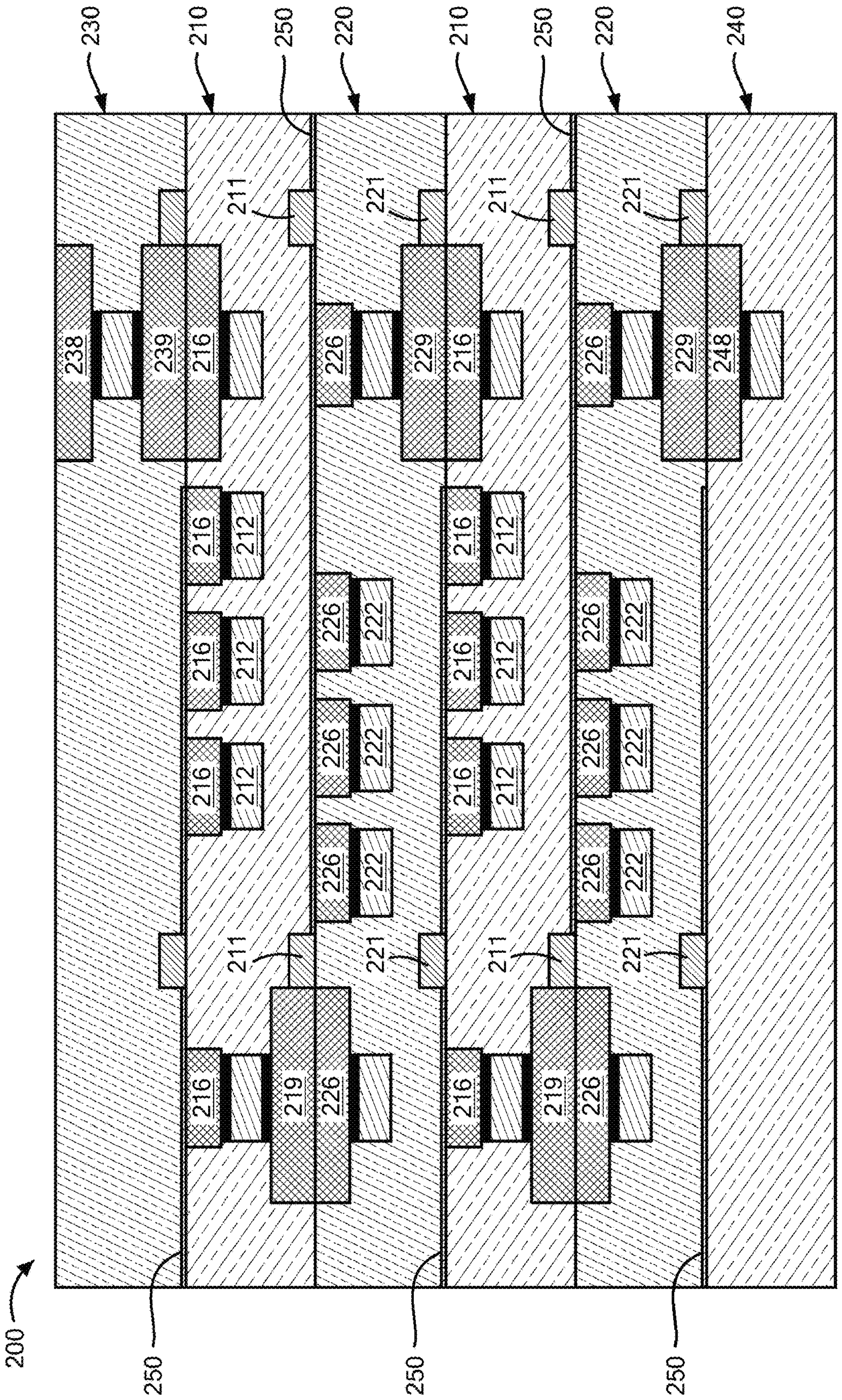

FIGS. 2A-2B show different cross-sections of an illustrative stack of plates in a superconducting magnet, according to some embodiments. Stack of plates 200 comprises two instances of plate 210 and two instances of plate 220, in addition to terminal plates 230 and 240. Layers of insulating material 250 are arranged at selected regions between neighboring plates. FIG. 2A represents a cross-section of the stack of plates through the racetrack portion of the channels of the plates, whereas FIG. 2B represents a cross-section of the stack of plates in the region in which the conducting channels "jog" in or out to switch lanes of the racetrack spiral.

As noted above in relation to FIG. 1, the open cooling channels in one plate may be arranged adjacent to the conducting channel of the neighboring plate. For example, as shown in FIG. 2A, which represents the racetrack portion of the channels, the cooling channels 211 in each instance of plate 210 are arranged adjacent to the cap 226 of the neighboring plate 220. Similarly, the cooling channels 221 in plate 220 are arranged adjacent to the cap 216, with cooling channels 231 arranged in the terminal cap 230 arranged adjacent to the uppermost instance of the plate 210.

It may be noted that cooling channels 221 in the lowermost instance of plate 220 are not strictly needed since there are no conductors adjacent to these channels. However, due to the modular nature of the plates in the stack 200, it may be more convenient to simply use an instance of plate 220 rather than fabricate a new type of plate that does not include the lowermost cooling channels 221.

In the example of FIGS. 2A-2B, the plates 210, 220, 230 and 240 are held together, at least in part, by bolts 280, which connect neighboring pairs of plates as shown in FIG. 2A. It may be presumed that such bolts are present at a number of locations around the plates 210, 220, 230 and 240, although the cross-section shown in FIG. 2B does not include any such bolts for clarity.

As shown in FIG. 2B, the plates may include conductive pads to connect the conductive paths in one plate to those of an adjacent plate. For example, the terminal plate 230 includes pad 239 which is adjacent to and electrically connected to the conductor 216 in the conducting channel of plate 210. Thus, the terminal plate may be adjacent to and electrically connected to one end of the conductive channel of plate 210, the other end of which is electrically connected to the pad 219. Pad 219 is, in turn, adjacent to and electrically connected to, the conductor 226 in the conducting channel of plate 220. The other end of the conductor 226 in the conducting channel of plate 220 is adjacent to and electrically connected to pad 229, which is adjacent to and electrically connected to the next plate 210, and so forth. In the example of FIG. 2B, the conductive pads 219, 229, 239 and 249 are shaded in the same manner as the caps of the plates, although it will be appreciated that in general the pads and caps need not comprise the same material(s).

According to some embodiments, insulating material 250 may comprise polyimide (e.g., Kapton®), epoxy resin, phenolic resin, glass epoxy laminate, a plastic, an elastomer, or combinations thereof. According to some embodiments, insulating material may have a breakdown voltage or dielectric strength of greater than 25 kV/mm, of greater than 50 kV/mm, of greater than 75 kV/mm, of greater than 100 kV/mm. In some cases, the voltages in the superconducting magnet may be comparatively low, in which case a low voltage standoff insulating material such as anodized aluminum could be utilized as the insulating material 250.

According to some embodiments, the baseplates 210*a*, 220*a*, 230*a* and 240*a* may each comprise, or may consist of, a high mechanical strength material such as but not limited to steel, Inconel®, Nitronic® 40, Nitronic® 50, Incoloy®, or combinations thereof. In some embodiments, the baseplates 210*a*, 220*a*, 230*a* and 240*a* may be plated with a metal such as nickel to facilitate adhesion of other components of the plate, including solder.

In the example of FIGS. 2A, bolts 290 are arranged within through holes of the plates 210, 220, 230 and 240 and affix neighboring pairs of plates to one another.

To further illustrate the structure of a stack of plates such as those shown in FIGS. 2A-2B, FIGS. 3A-3D depict upper and lower views of individual plates 210 and 220.

Figure 3A:
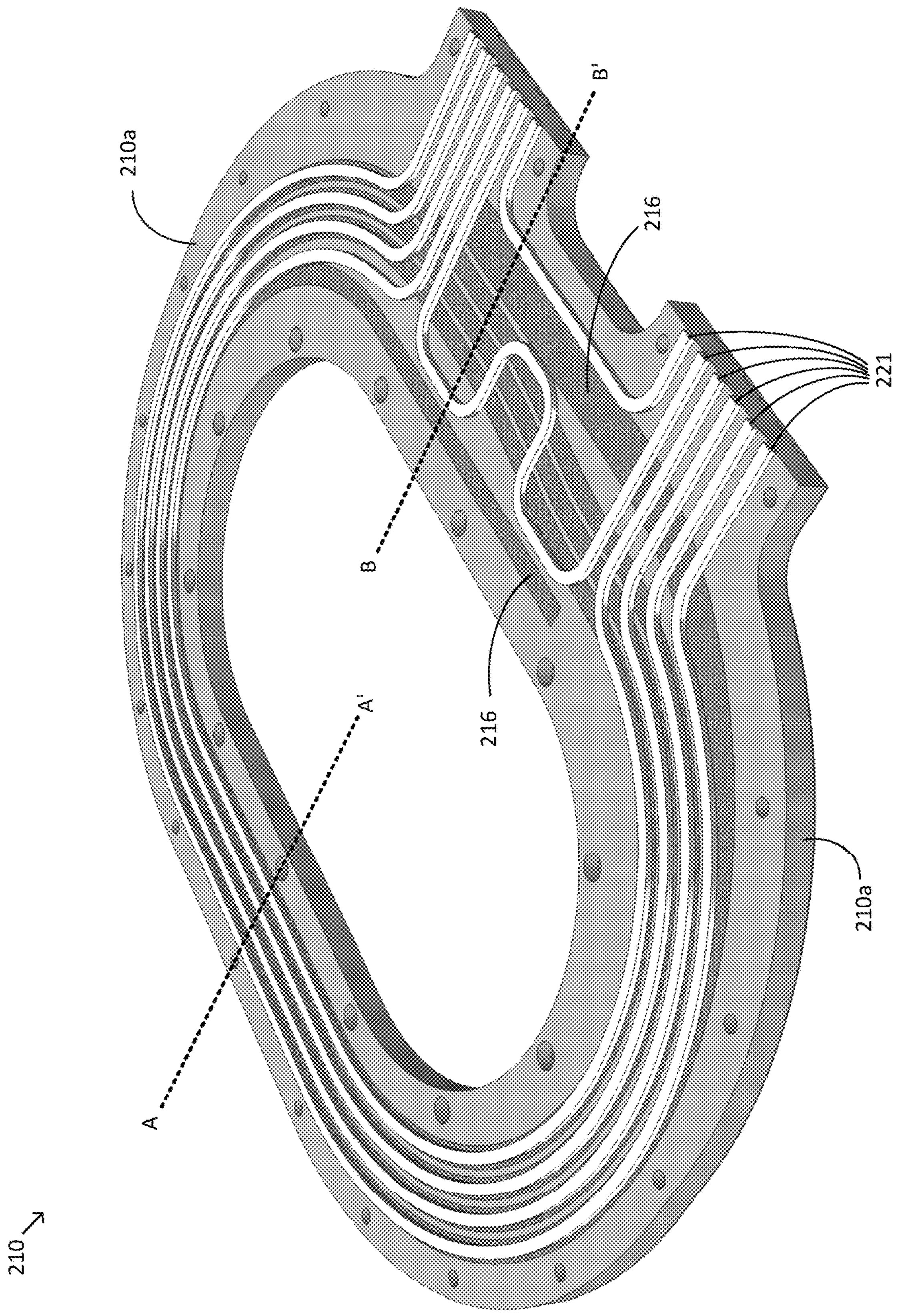
FIGS. 3A-3B are perspective views of opposing surfaces of an illustrative individual plate of a type which may be included in a stack of plates in a superconducting magnet, according to some embodiments.
Figure 3B:
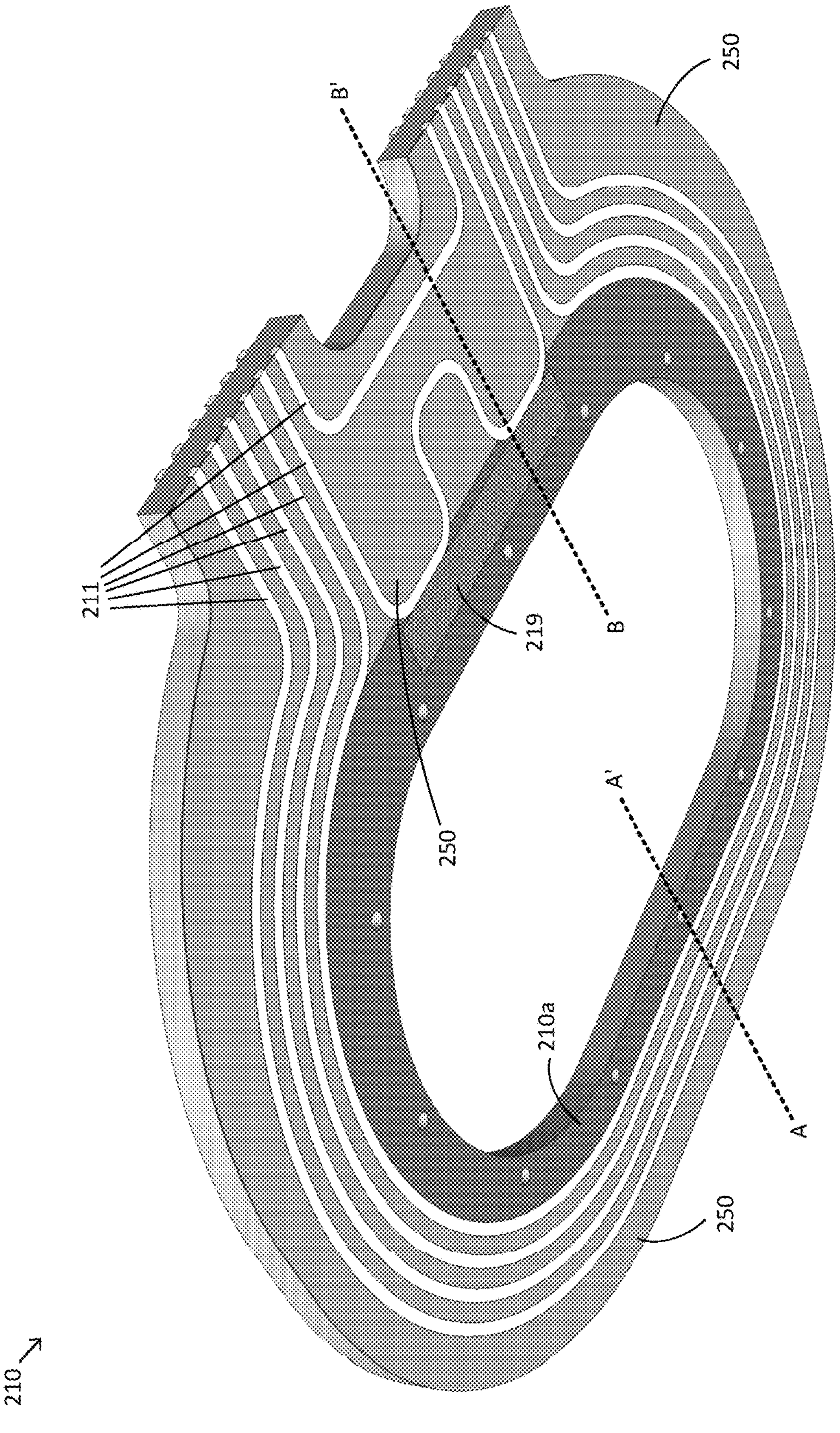

FIGS. 3A and 3B depict upper and lower views, respectively, of plate 210, wherein the cross-section of FIG. 2A is through the section marked A-A' and the cross-section of FIG. 2B is through the section marked B-B'. In the example of FIGS. 3A-3B, the location of cooling channels 221, which are part of plate 220 arranged above the plate 210, are shown for purposes of explanation, although it will be appreciated that these cooling channels are not in fact part of the plate 210. As may be noted, the conducting channel of plate 210 in this example has an inward spiral when following the channel in a clockwise direction viewed from above.

As may be seen in FIG. 3A, for the bulk of the racetrack sections of the conducting channel of the plate 210—of which the cap 216 is visible—the cooling channels 221 of the neighboring plate 220 are aligned with the conducting channel. As such, cryogen passing through the cooling channels may directly contact the cap 216 and deliver cooling to the HTS material arranged beneath the cap as discussed above.

The region of the plate 210 between the coolant inlet and outlet (the two regions where the coolant channels meet the edge of the plate) includes, in the example of FIG. 3A, a "meandering" region of the cooling channel 221 that meanders back and forth over the conducting channels 216. Various other arrangements may be envisioned, including a cooling channel that is aligned with a single conducting channel, but runs back and forth over successive cooling channels in the region between the inlet and outlet.

Figure 11B:
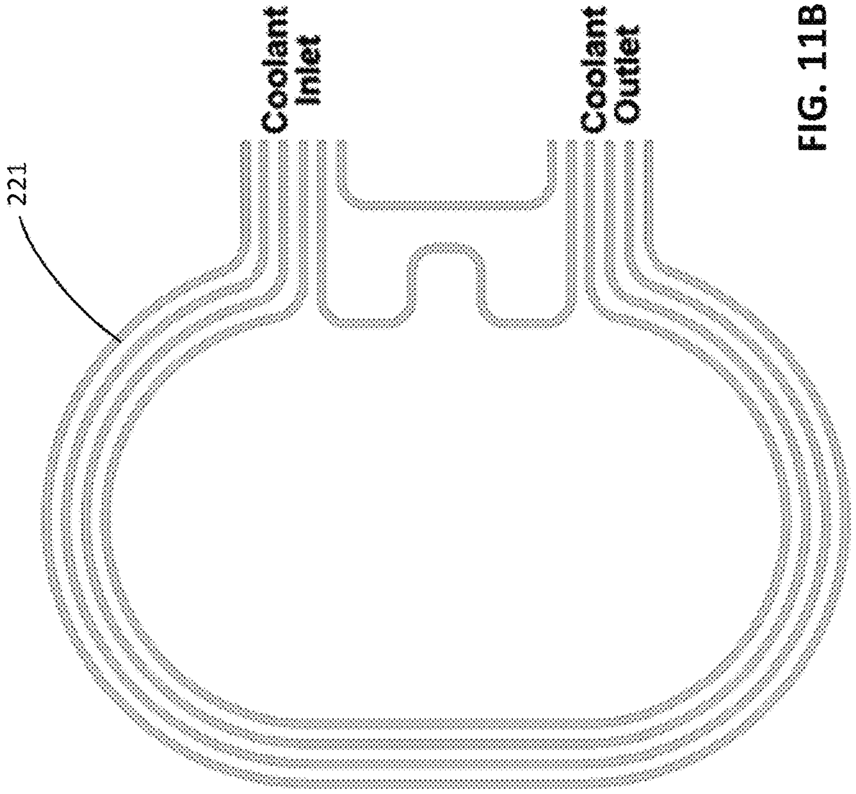
FIGS. 11A-11B depicts aerial views of illustrative cooling channel arrangements, according to some embodiments.
Figure 11A:
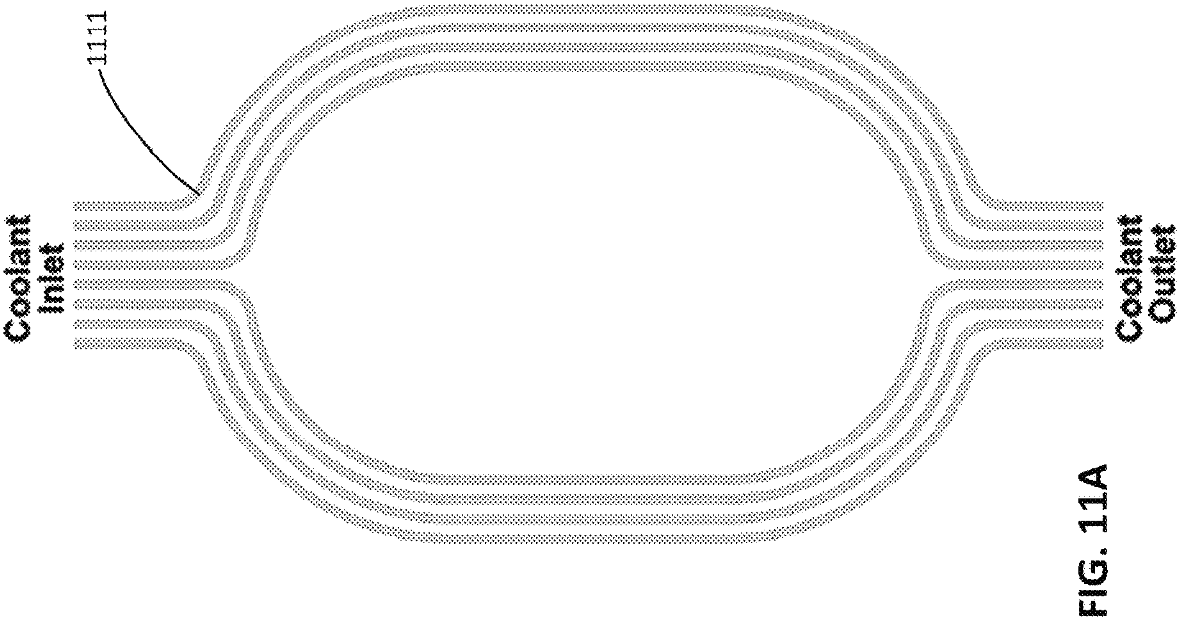

In some embodiments, the inlet and outlet regions of the plate may be further apart than is shown in the example of FIG. 3A, such as at opposite ends of the plate from one another. In such cases, the cooling channels may be arranged so that some cooling channels (e.g., half) pass along one side of the plate with the other cooling channels passing along the other side of the plate. An example of such a cooling channel configuration is depicted in FIG. 11A, which shows a single layer of cooling channels 1111 in an aerial view. FIG. 11B depicts the cooling channels 221 of the layer of the plate shown in FIG. 3A with the same aerial view for comparison. It may be noted that alternative cooling channel arrangements such as that shown in FIG. 11A may be arranged on a plate without altering the structure of the other elements of the plate except for the portion(s) of the baseplate that connect the cooling channels to the edge of the plate. For instance, as shown in FIG. 3A the cooling channels may be arranged as shown in FIG. 11A without altering the conductive channels of the plate.

FIG. 3B illustrates the underside of plate 210, and includes portions to which insulating material 250 is attached, and portions for which the baseplate 210*a* is exposed.

Figure 3C:
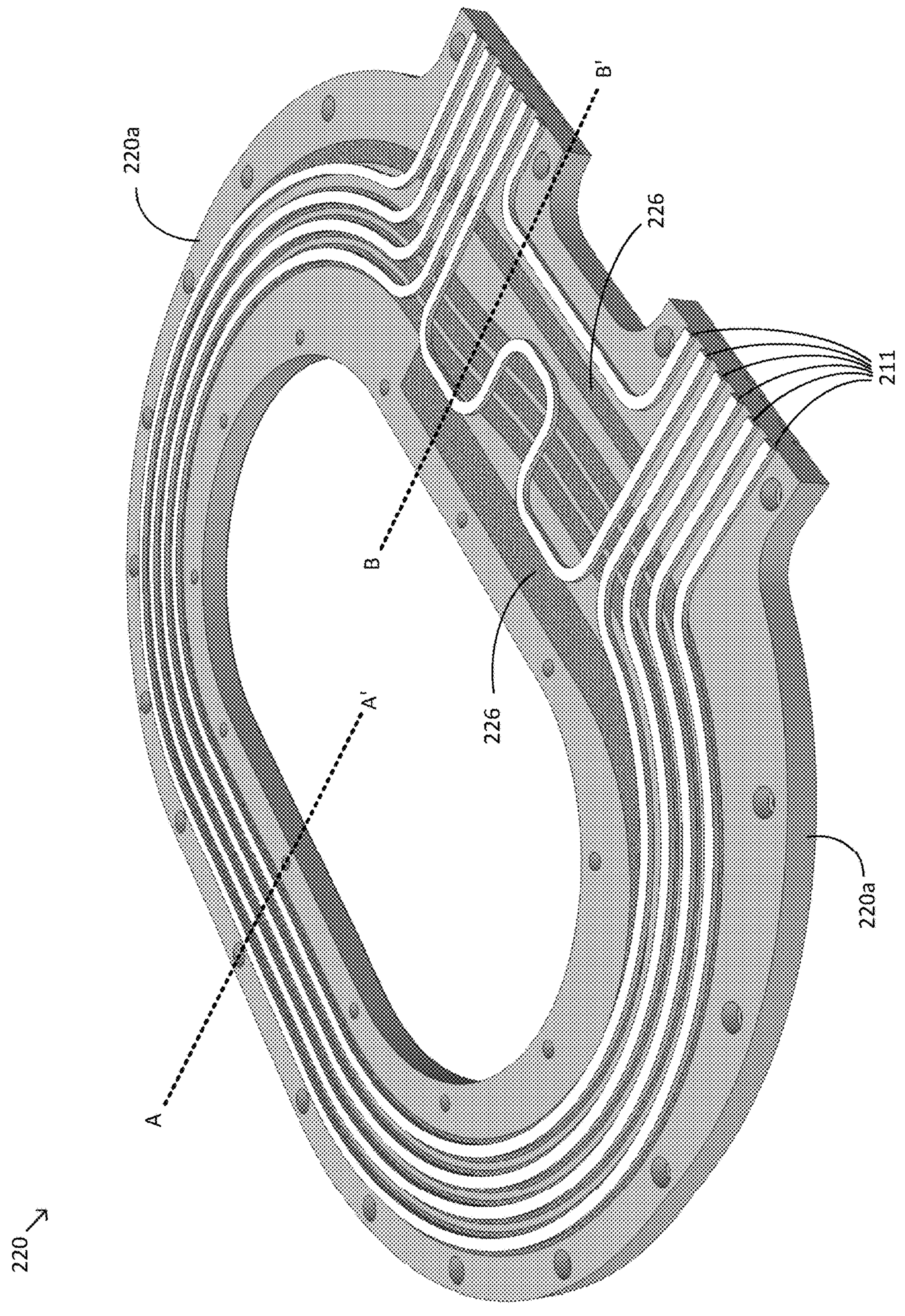
FIGS. 3C-3D are perspective views of opposing surfaces of an illustrative individual plate of a type which may be included in a stack of plates in a superconducting magnet, according to some embodiments.
Figure 3D:
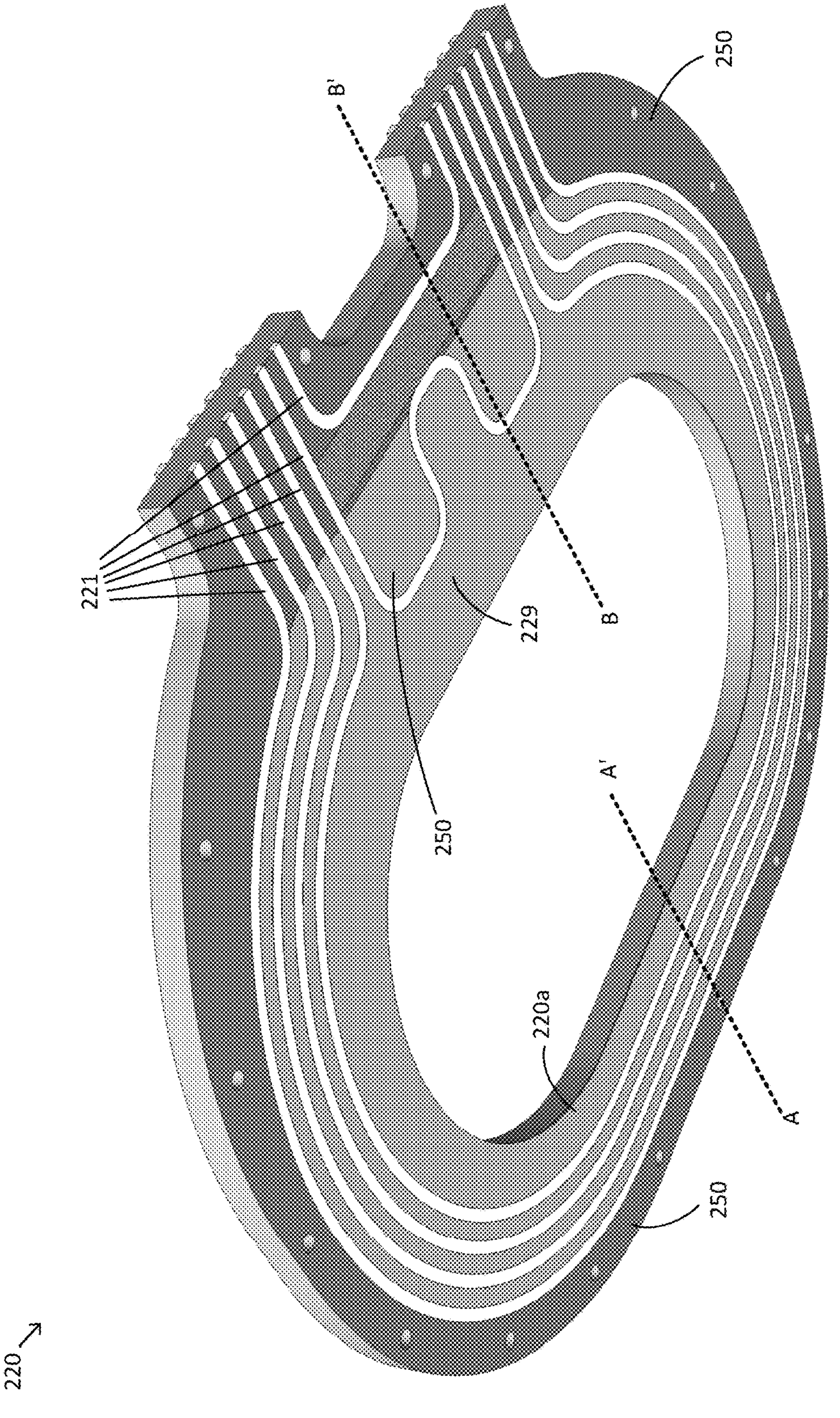

FIGS. 3C and 3D depict upper and lower views, respectively, of plate 220, wherein the cross-section of FIG. 2A is through the section marked A-A' and the cross-section of FIG. 2B is through the section marked B-B'. In the example of FIGS. 3C-3D, the location of cooling channels 211, which are part of plate 210 arranged above the plate 220, are shown for purposes of explanation, although it will be appreciated that these cooling channels are not in fact part of the plate 220. As may be noted, the conducting channel of plate 220 in this example has an outward spiral when following the channel in a clockwise direction viewed from above.

As may be seen in FIG. 3C, for the bulk of the racetrack sections of the conducting channel of the plate 220—of which the cap 226 is visible—the cooling channels 211 of the neighboring plate 210 are aligned with the conducting channel. As such, cryogen passing through the cooling channels may directly contact the cap 226 and deliver cooling to the HTS material arranged beneath the cap as discussed above.

The region of the plate 220 between the coolant inlet and outlet (the two regions where the coolant channels meet the edge of the plate) includes, in the example of FIG. 3C, a "meandering" region of the cooling channel 211 that meanders back and forth over the conducting channels 226. Various other arrangements may be envisioned, including a cooling channel that is aligned with a single conducting channel, but runs back and forth over successive cooling channels in the region between the inlet and outlet.

In some embodiments, the inlet and outlet regions of the plate may be further apart than is shown in the example of FIG. 3C, such as at opposite ends of the plate from one another. In such cases, the cooling channels may be arranged so that some cooling channels (e.g., half) pass along one side of the plate with the other cooling channels passing along the other side of the plate.

FIG. 3D illustrates the underside of plate 220, and includes portions to which insulating material 250 is attached, and portions for which the baseplate 220*a* is exposed.

Figure 4:
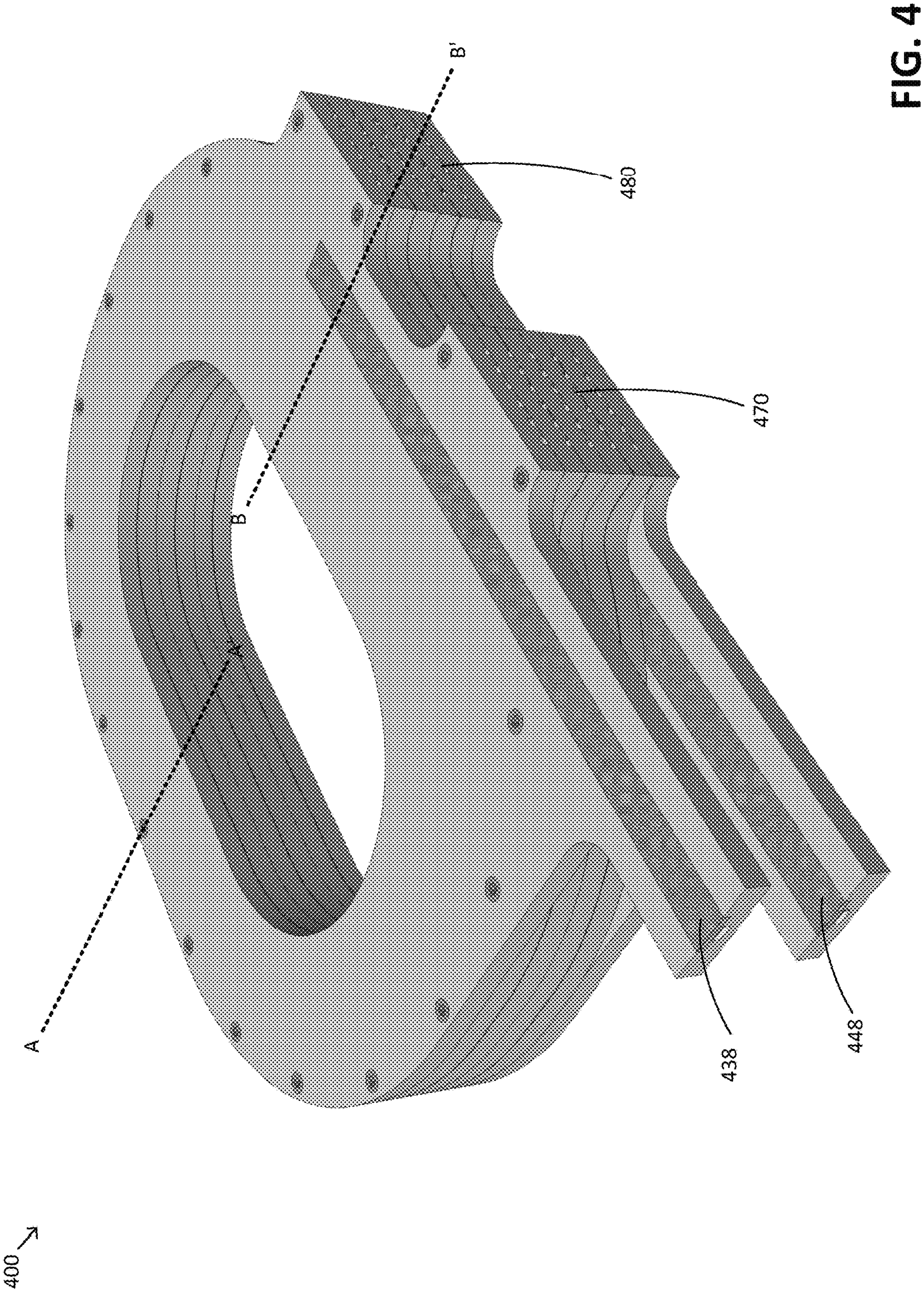
FIG. 4 is a perspective view of an illustrative stack of plates of a superconducting magnet, according to some embodiments.

FIG. 4 is a perspective view of an illustrative stack of plates of a superconducting magnet, according to some embodiments. Stack of plates 400 represents an exterior perspective view of the stack of plates shown in cross-section in FIGS. 2A-2B. As in FIGS. 3A-3D, the cross-section of FIG. 2A is through the section marked A-A' and the cross-section of FIG. 2B is through the section marked B-B'.

Figure 5:
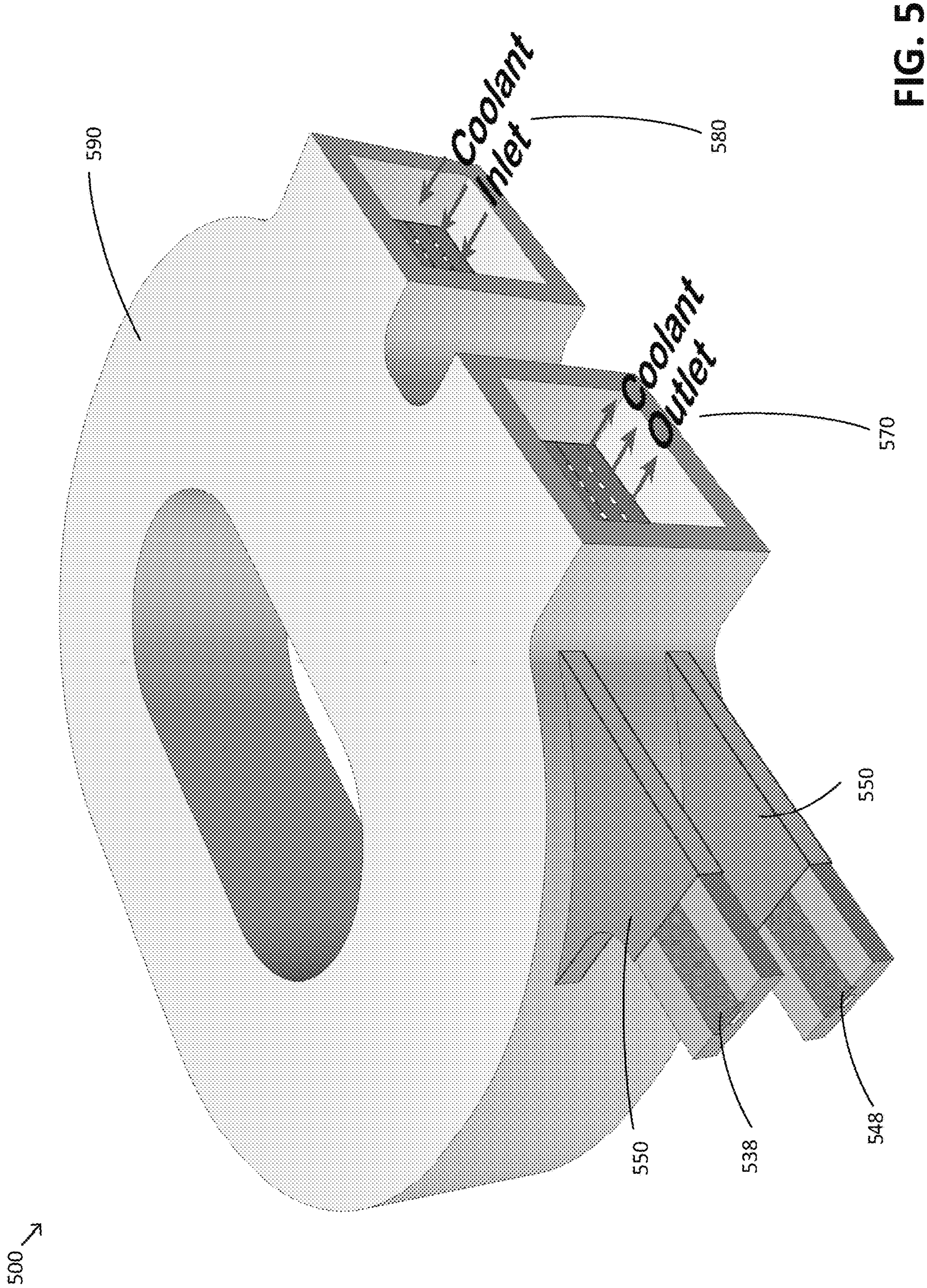
FIG. 5 is a perspective view of an illustrative stack of plates of a superconducting magnet with an exterior case, according to some embodiments.

As shown in the example of FIG. 4, the terminal plates at the top and the bottom of the stack each comprise a conductive portion 438 and 448, respectively, that extends outward from the stack and that are electrically connected to one another through the spiral conducting paths within the stack. Each cooling channel of the plates of the stack terminates at a common set of ports 470 at one end of the channel and at a common set of ports 480 at the other end of the channel. Since the ends of the cooling channels are arranged together, with all the inlets together and all the outlets together, a single large inlet or outlet port may be formed (e.g., via traditional machining processes, via additive and/or subtractive processes, etc.) around the set of channels at each end, as shown in FIG. 5. This may allow coolant to pass through all the cooling channels of the stack of plates using just a single inlet pipe and a single outlet pipe.

FIG. 5 is a perspective view of an illustrative stack of plates of a superconducting magnet with an exterior case, according to some embodiments. Subsequent to assembly of the stack of plates, some or all of the exterior of the stack may have an insulating material disposed thereon (e.g. some or all of the exterior of the stack may be wrapped in an insulating material). In the example of FIG. 5, the entire stack of plates except for the cooling inlet and outlet 570 and 580, and the ends of the terminal plates that include conductive portions 528 and 548, are wrapped in an insulating material 550 such as polyimide (e.g., Kapton®), epoxy resin, phenolic resin, glass epoxy laminate, a plastic, an elastomer, or combinations thereof. According to some embodiments, the insulating material 550 may have a breakdown voltage or dielectric strength of greater than 25 kV/mm, of greater than 50 kV/mm, of greater than 75 kV/mm, of greater than 100 kV/mm. In some cases, the voltages in the superconducting magnet may be comparatively low, in which case a low voltage standoff insulating material such as anodized aluminum could be utilized as the insulating material 550.

Subsequent to application of the insulating material 550, the stack of plates are enclosed within a case 590, which provides further structural stability to the stack of plates and may comprise fiberglass, for instance. In some cases, the case 590 may comprise a high mechanical strength material such as but not limited to steel, Inconel®, Nitronic® 40, Nitronic® 50, Incoloy®, or combinations thereof. In some embodiments, any gaps between the stack of plates and the case 590 may be filled with an insulating material such as epoxy resin.

Figure 6:
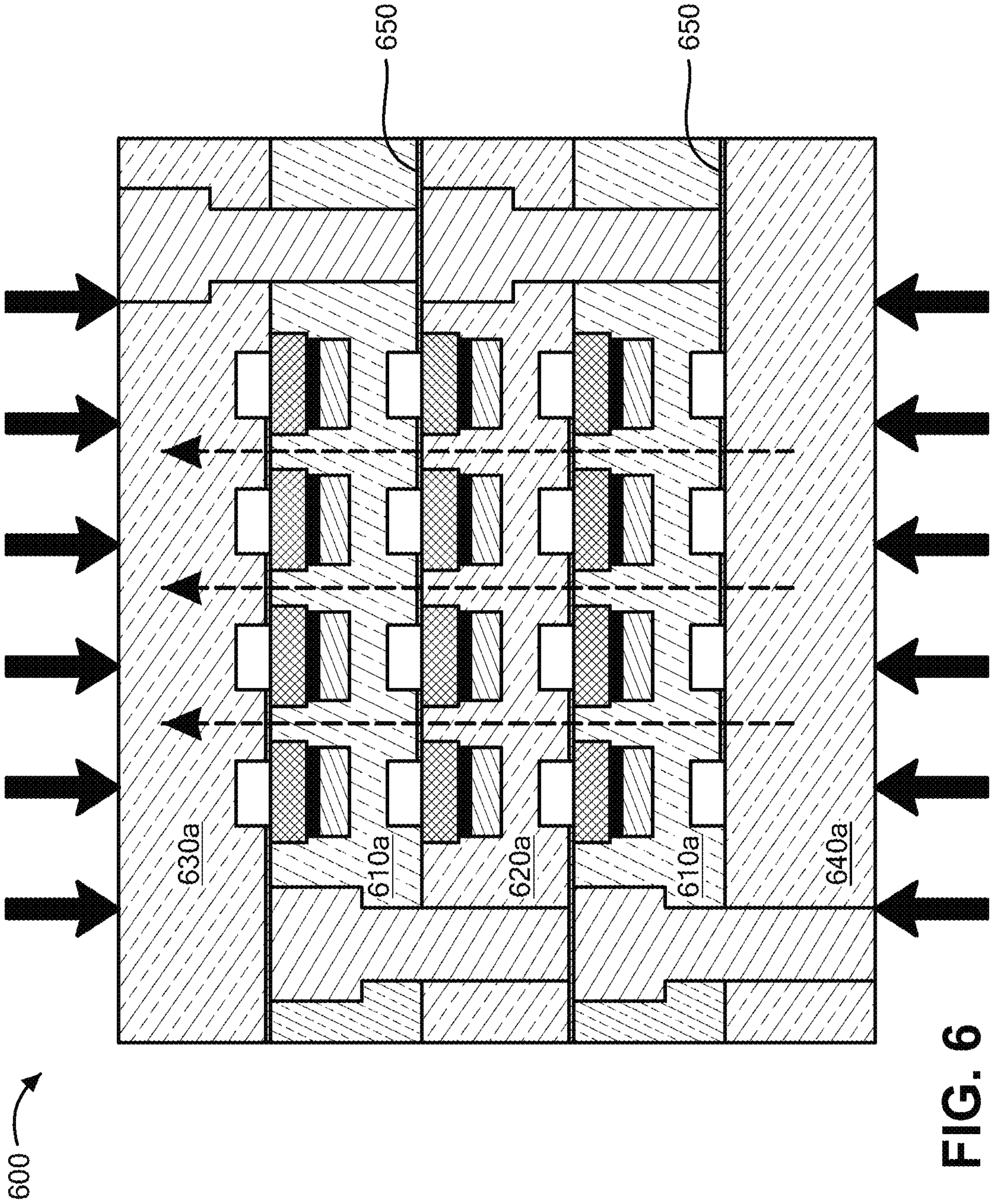
FIG. 6 depicts a cross-sectional view of a stack of plates depicting the structural load on the stack, according to some embodiments.

As discussed above, alignment of the cooling channels and the conducting channels across the plates provides structural benefits, as illustrated in FIG. 6, which depicts a cross-sectional view of a stack of plates similar to that shown in FIG. 2A to depict the structural load on such a stack.

As shown in FIG. 6, in zones where the cooling channels and the conducting channels are aligned along the thickness dimension of the stack (the dimensional along which the plates are stacked on top of one another), the high-strength material in the baseplates 610*a*, 620*a*, 630*a* and 640*a* makes direct contact through the thin insulating material 650. This effectively forms a strong structural 'cage' that surrounds the conductors, shunting the load path around them. As a result, the primary load path passes between the conducting channels and the cooling channels, as shown by the vertical dashed arrows.

Furthermore, out-of-plane IxB body loads from the individual HTS/cap stacks are transferred to this structure, minimizing accumulation of compressive loads on the HTS/cap composite. Similarly, external out-of-plane compressive loads are shunted around the conductors via the cage structure.

Figure 7:
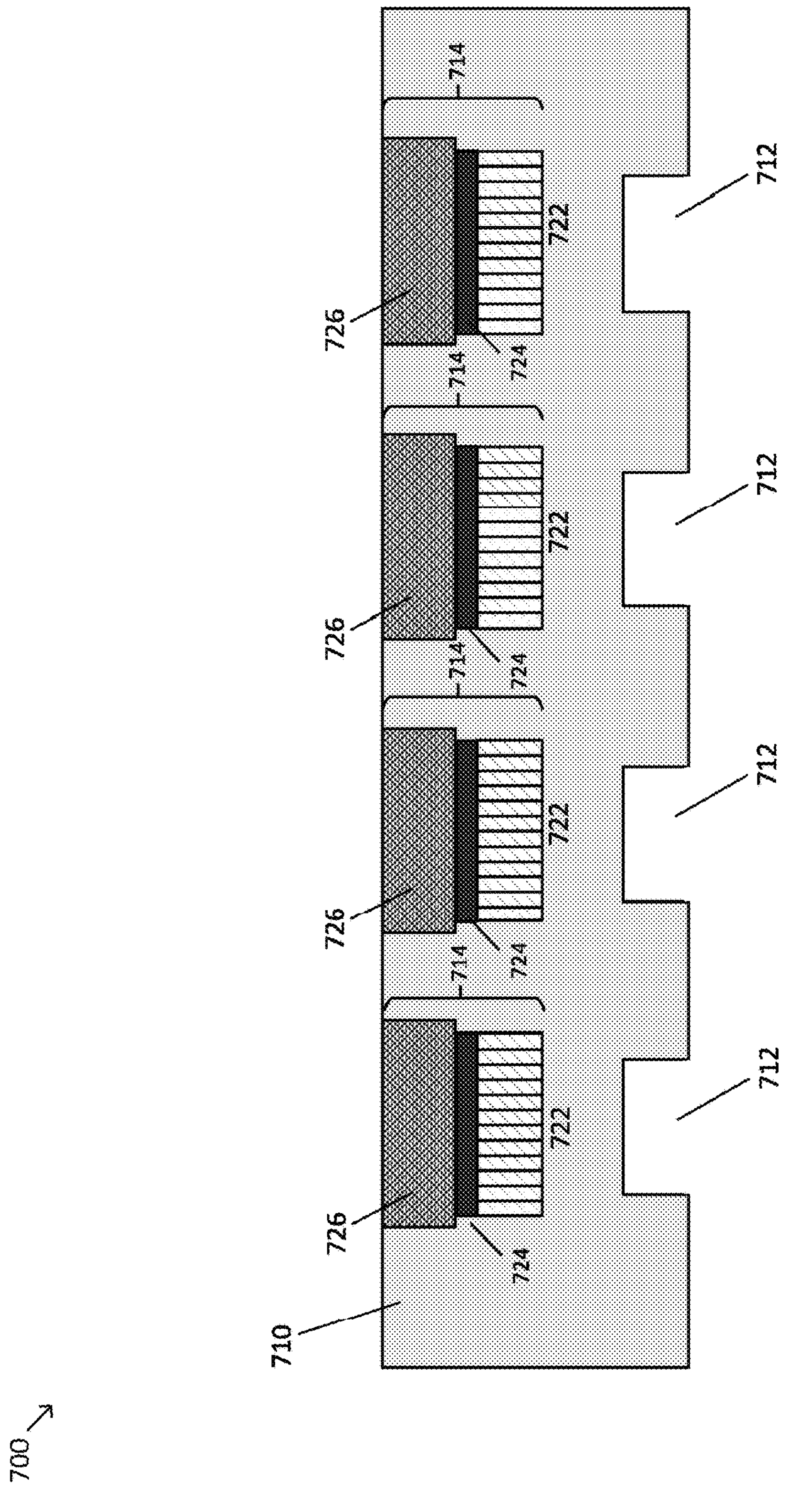
FIG. 7 illustrates an example of a plate in which HTS material is provided as a stack of HTS tape, according to some embodiments.

As discussed above in relation to FIG. 1, the HTS material 122 shown in FIG. 1 may comprise a co-wound stack of HTS tapes. FIG. 7 illustrates an example of plate 100 of FIG. 1 in which the HTS material is provided as a stack of HTS tapes 722. In FIG. 7, the plate 700 comprises a baseplate material 710, cooling channels 712, conductive material 724 and caps 726. HTS tape may comprise a long, thin strand of HTS material with cross-sectional dimensions in the range of about 0.001 mm to about 0.1 mm in thickness (or height) and a width in the range of about 1 mm to about 12 mm (and with a length that extends along the length of the cable, i.e., into and out of the page in the example of FIG. 7). According to some embodiments, HTS tapes 722 may comprise an HTS material in addition to cladding materials such as copper. In some embodiments, HTS tape may comprise a polycrystalline HTS and/or may have a high level of grain alignment.

Figure 8:
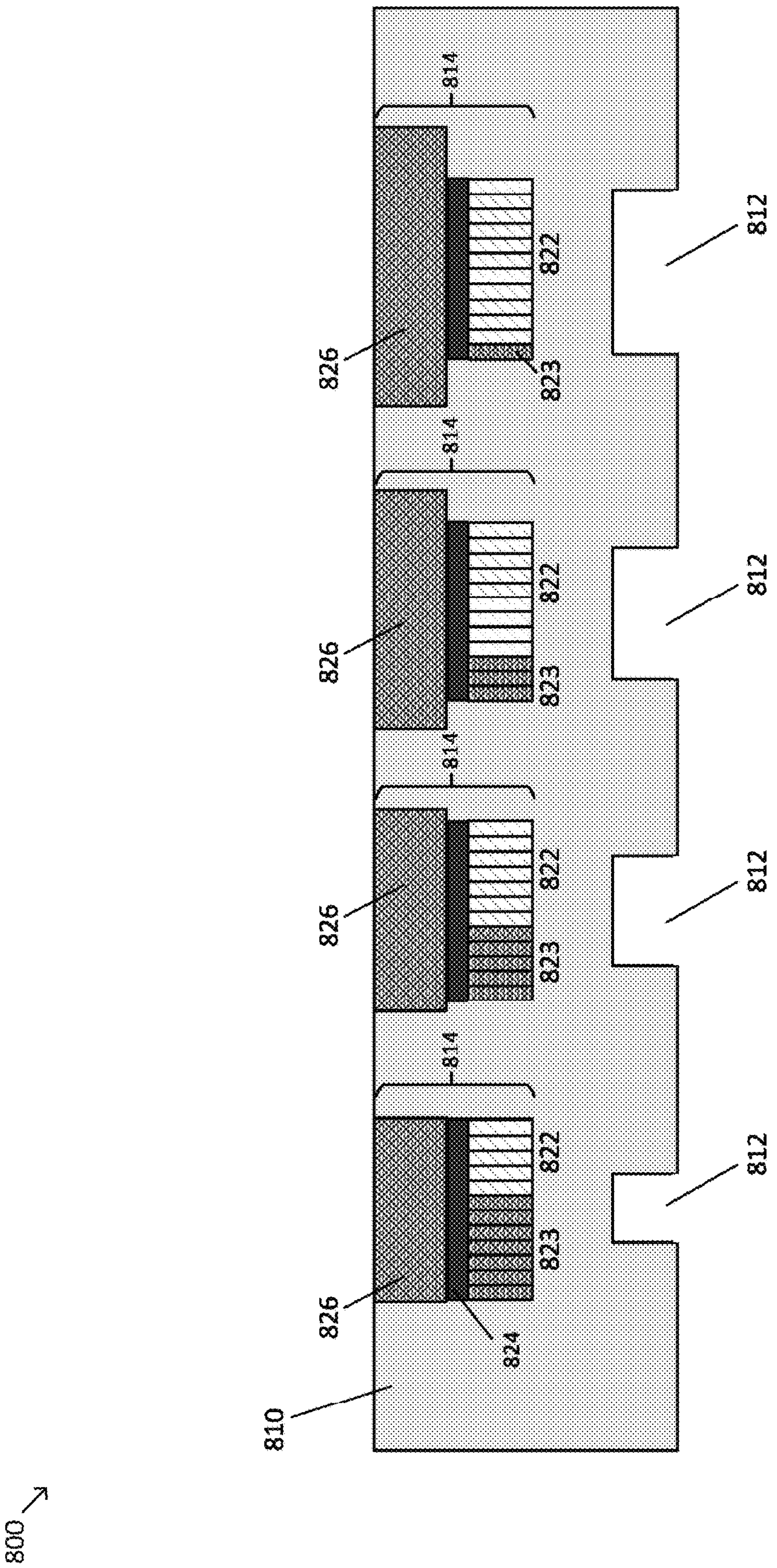
FIG. 8 illustrates an example of a plate in which the conducting channels comprise a stack of co-wound HTS tapes in addition to conductive co-wound tape, according to some embodiments.

In some situations in which the HTS material is provided as an HTS tape, it may be desirable to vary the number of HTS conductors in a stack of co-wound HTS tapes according to their location within the magnet, thereby reducing the total amount of HTS tape needed to construct the magnet. FIG. 8 illustrates an example of plate 100 of FIG. 1 in which the conducting channels 814 comprise a stack of co-wound HTS tapes 822 in addition to conductive co-wound tape 823 (e.g., copper tape). As may be noted from FIG. 8, the number of HTS tapes is decreased in each turn going from right to left in FIG. 8, while the number of conductive co-wound tapes is increased right-to left. The width of the cap 826 is varied in conjunction with number of conductive co-wound tapes such that their combined cross-sectional area is roughly constant in every turn. In this way, the resistance per unit length of the co-conductor is maintained constant throughout the winding pack.

Tuning the amount of HTS tape 822, co-wound conductive tape 823, and the size of the cap 826 may provide a way to control the rate of magnetic energy dissipation during a quench, and in some cases may dissipate the magnetic energy uniformly throughout the winding pack during a full magnet quench event. In addition, tuning the amount of HTS tape 822, co-wound conductive tape 823, and the size of the cap 826 may alter an amount of magnetic energy deposition in adjacent areas. This may allow, for instance, reduction of the magnetic energy deposition in critical areas such as in regions with joints.

Figure 9A:
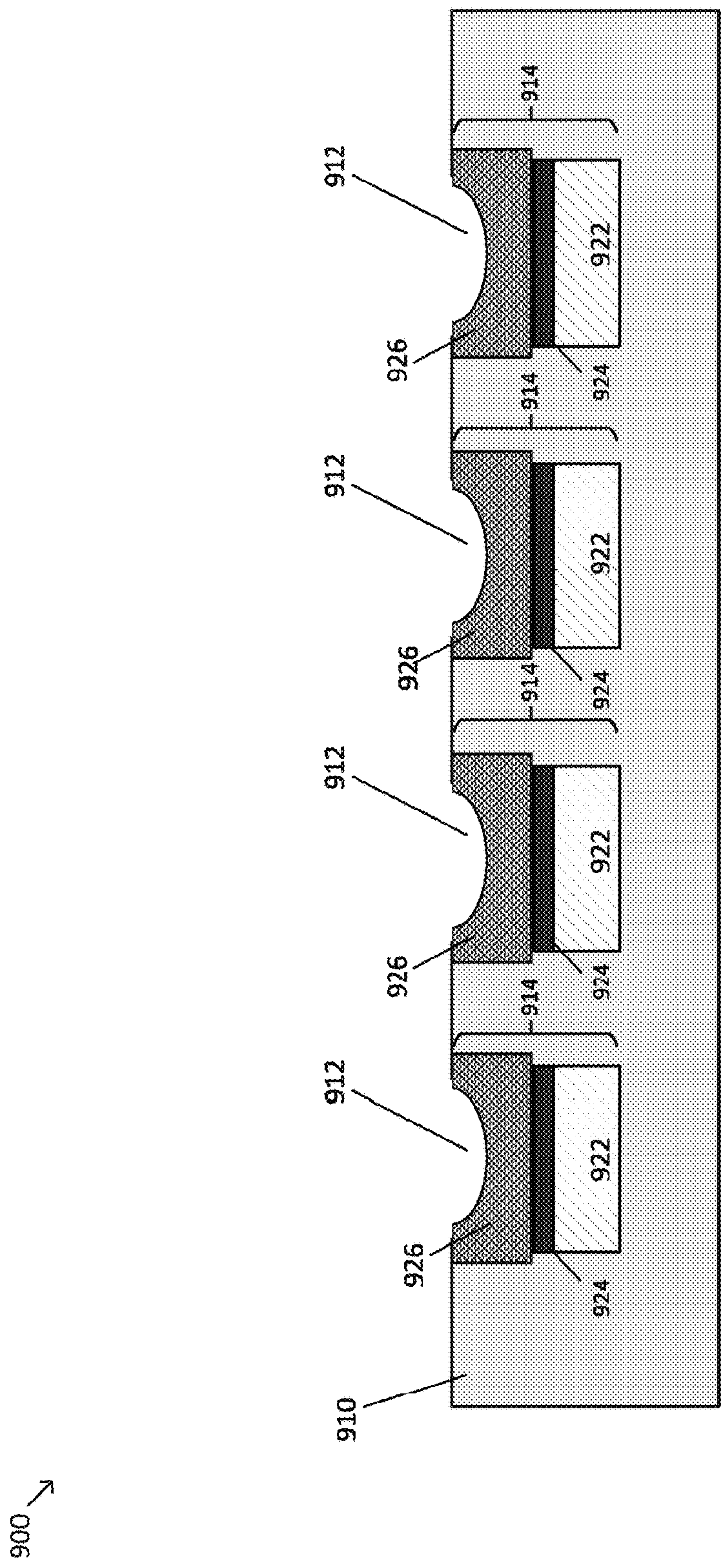
FIGS. 9A-9C depict cross-sections of illustrative plates suitable for use in a stacked-plate superconducting magnet in which the cooling channels are arranged within the conducting channels, according to some embodiments.

While in each of the examples discussed above, the cooling channels are arranged on the opposite side of a plate from the conducting channels, in some cases it may be preferable to provide the cooling channels within the conducting channels. FIG. 9A is a cross-section of a portion of an illustrative plate suitable for use in a stacked-plate superconducting magnet in which the cooling channels are arranged within the conducting channels, according to some embodiments.

As shown in FIG. 9A, the conducting channels 914 also comprise the cooling channels 912, which are formed (e.g., via traditional machining processes, via additive and/or subtractive processes, etc.) by appropriate shaping of the caps 926 (although any portion of the conducting channel could be shaped as desired in general). The co-linear conducting channels 914 and cooling channels 912 are arranged within the baseplate 910. While in the example of FIG. 9A the conductive material 926 have the cooling channels provided therein, it will be appreciated that cooling channels could be in general formed (e.g., via traditional machining processes, via additive and/or subtractive processes, etc.) in the conductive material and/or HTS 922, depending on the geometrical arrangement of the conductive material and HTS within the conductive channel, since the cooling channels may be formed or provided from at least portions of concave regions of the upper portion of the material within the conductive channel.

In the example of FIG. 9A, the plate 900 can thereby be stacked on top of multiple instances of itself to produce a stack of plates in which the cooling channels are adjacent to the conducting channels. This stacking may be performed in two different ways, which are depicted in FIGS. 9B and 9C.

Figure 9B:
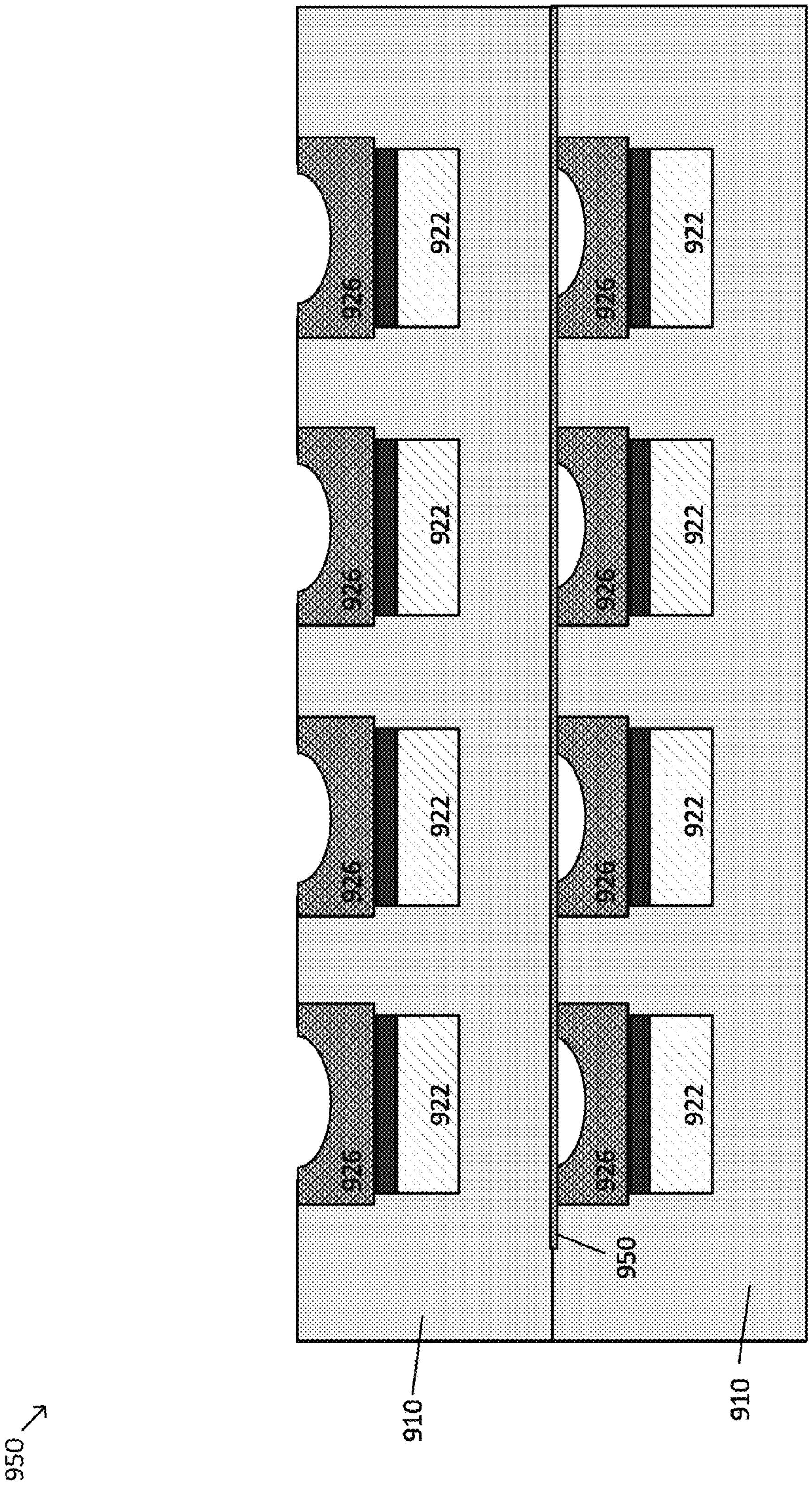

As shown in FIG. 9B, a magnet 950 may comprise two instances of the plate 900 stacked on top of one another, wherein a planar face of one of the plates rests over the cooling channels, thereby bounding the cooling channels. As a result, when coolant is passed through the magnet 950, it may contact the conductive material 926 in one plate and the baseplate material in the adjacent plate. An insulating layer 950 may be arranged between the baseplates 910.

Figure 9C:
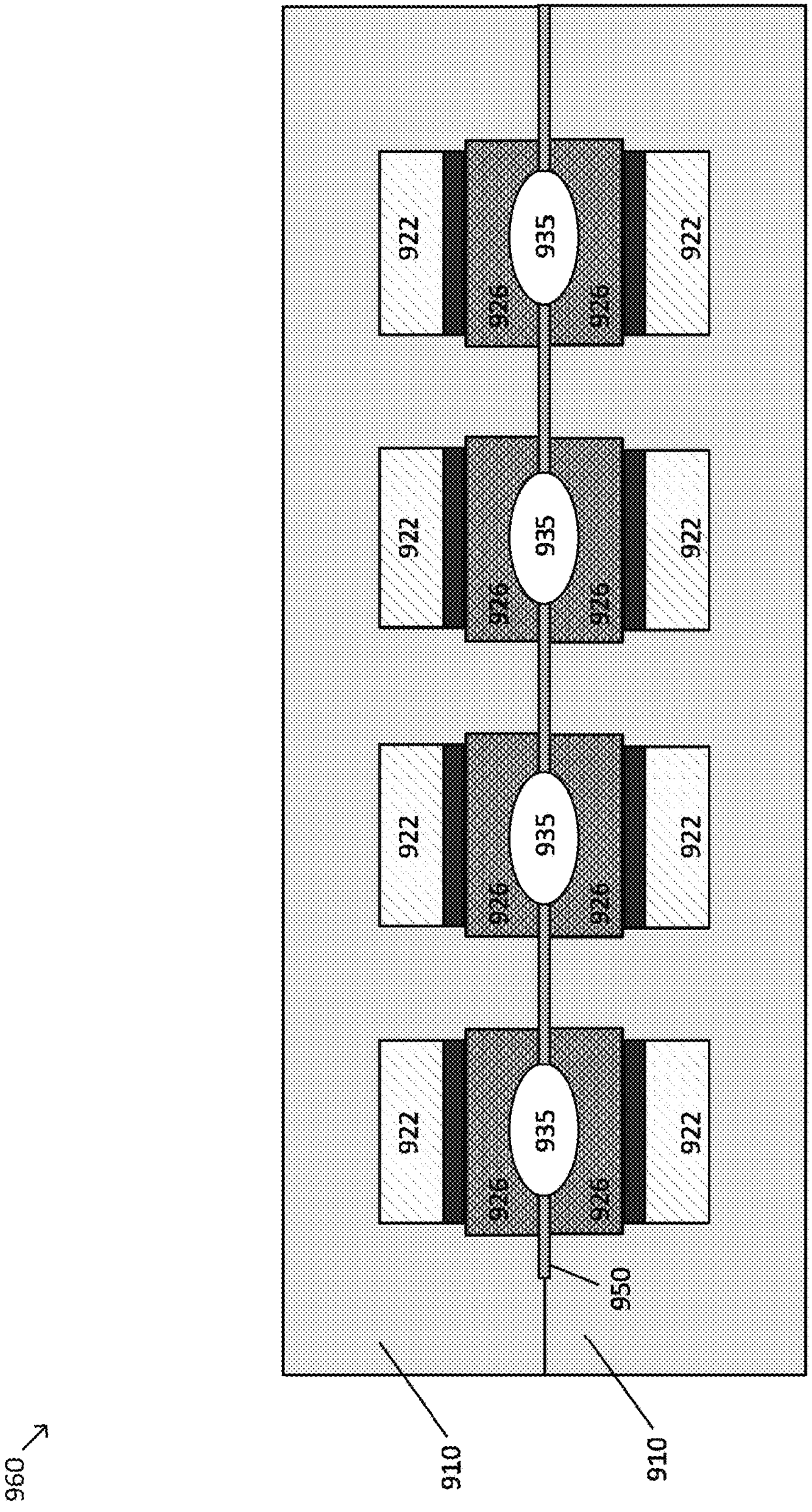

Alternatively, as shown in FIG. 9C, a magnet 960 may comprise two instances of the plate 900 stacked on top of one another wherein the orientation of one plate 900 is flipped so that the cooling channels contact one another and are aligned, forming cooling channels 935, which are actually a combination of the cooling channels 912 formed in each of the two plates and aligned so that their surfaces bound one another. An insulating layer 950 may be arranged between the baseplates 910. It will be appreciated that some or all of insulating layer 950 in FIG. 9C may comprise air as an insulator. For instance, the illustrated layer may not extend all the way to the cooling channels 935 as shown, with a small air gap left between the two layers of conductive material 926 adjacent to the cooling channels.

Figure 10:
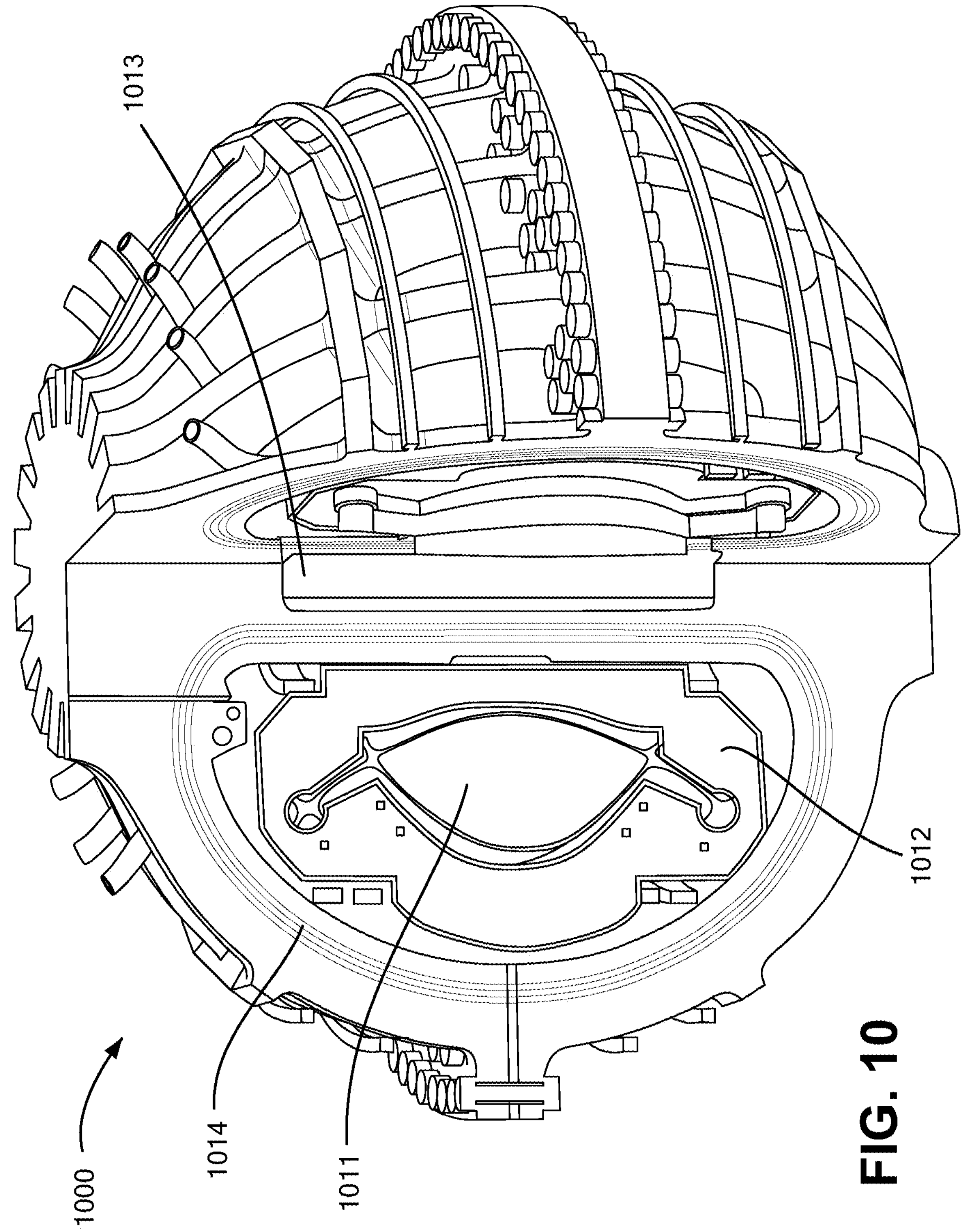
FIG. 10 is a three-dimensional graphic of a fusion power plant with a cutaway portion illustrating various components of the power plant, according to some embodiments.

FIG. 10 is a three-dimensional graphic of a fusion power plant with a cutaway portion illustrating various components of the power plant, according to some embodiments. A magnet within a fusion power plant may be formed from superconductor arrangement as described above. FIG. 10 shows a cross-section through a power plant and includes a magnet coil 1014, which is fabricated from, or otherwise includes, a superconducting magnet comprising a stack of plates as discussed and described above, a neutron shield 1012, and a core region 1011. According to some embodiments, the magnet coil 1014 may be, or may form part of, a toroidal field coil. Magnet coil 1013 may be fabricated from, or otherwise includes, a superconducting magnet comprising a stack of plates as discussed and described above. According to some embodiments, the magnet coil 1013 may be, or may form part of a central solenoid and/or other poloidal field solenoidal coils.

Persons having ordinary skill in the art may appreciate other embodiments of the concepts, results, and techniques disclosed herein. It is appreciated that superconducting cables configured according to the concepts and techniques described herein may be useful for a wide variety of applications, including applications in which the superconducting cable is wound into a coil to form a magnet. For instance, one such application is conducting nuclear magnetic resonance (NMR) research into, for example, solid state physics, physiology, or proteins, for which such cables may be wound into a magnet. Another application is performing clinical magnetic resonance imaging (MRI) for medical scanning of an organism or a portion thereof, for which compact, high-field magnets are needed. Yet another application is high-field MRI, for which large bore solenoids are required. Still another application is for performing magnetic research in physics, chemistry, and materials science. Further applications is in magnets for particle accelerators for materials processing or interrogation; electrical power generators; medical accelerators for proton therapy, radiation therapy, and radiation generation generally; superconducting energy storage; magnetohydrodynamic (MHD) electrical generators; and material separation, such as mining, semiconductor fabrication, and recycling. It is appreciated that the above list of applications is not exhaustive, and there are further applications to which the concepts, processes, and techniques disclosed herein may be put without deviating from their scope.

As used herein, a "high temperature superconductor" or "HTS" refers to a material that has a critical temperature above 30 K, wherein the critical temperature refers to the temperature below which the electrical resistivity of the material drops to zero.

Illustrative examples of conducting channels and cooling channels are described herein and illustrated in the drawings. It will be appreciated that the particular size and shape of these channels are provided merely as examples and that no particular cross-sectional shape or size is implied as being necessary or desirable unless otherwise noted.

Having thus described several aspects of at least one embodiment which illustrate the described concepts, it is to be appreciated that various alterations, modifications, and improvements will readily occur to those skilled in the art.

Such alterations, modifications, and improvements are intended to be part of this disclosure, and are intended to be within the spirit and scope of the concepts described herein. Further, though advantages of the concepts described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the concepts described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A magnet comprising:

a plurality of plates arranged in a stack that includes a first plate and a second plate, the first plate comprising:

a conducting channel on a first side of the first plate, at least part of the conducting channel being arranged in a spiral path, the conducting channel comprising a high temperature superconductor (HTS) material and a conductive material; and a first plurality of cooling channels on a second side of the first plate, the second side opposing the first side; and the second plate comprising a second plurality of cooling channels, wherein the first and second plates are arranged next to one another in the stack such that the second plurality of cooling channels are adjacent to the conductive material in the conducting channel of the first plate.

2. The magnet of claim 1, wherein the conductive material is arranged over the HTS material.

3. The magnet of claim 2, wherein the conductive material arranged over the HTS material has an upper surface that is flush with the first side of the first plate.

4. The magnet of claim 1, wherein at least part of each of the first plurality of cooling channels is aligned with the spiral path of the at least part of the conducting channel.

5. The magnet of claim 1, further comprising at least one bolt coupling the first plate to the second plate.

6. The magnet of claim 1, further comprising a plurality of instances of the first plate and a plurality of instances of the second plate arranged in the stack, wherein the plurality of the plates in the stack alternate between the instances of the first plate and the instances of the second plate.

7. The magnet of claim 1, further comprising a cooling inlet coupled to first ends of the first and second plurality of cooling channels and a cooling outlet coupled to second ends of the first and second plurality of cooling channels.

8. The magnet of claim 1, further comprising an insulating material arranged between the first plate and the second plate such that the first plate and second plate both contact the insulating material.

9. The magnet of claim 8, wherein the insulating material covers a portion of an interface between the first plate and the second plate so that at least part of the first plate directly contacts the second plate.

10. The magnet of claim 1, wherein the spiral path is a racetrack spiral.

11. The magnet of claim 1, wherein the first plate is formed from a first material in which the first plurality of cooling channels and the conducting channel are formed, and wherein the first material comprises steel.

12. The magnet of claim 1, wherein the HTS material comprises a stack of HTS tapes.

13. The magnet of claim 12, wherein each HTS tape of the stack of HTS tapes comprises a rare earth barium copper oxide (REBCO) material wrapped in copper cladding.

14. The magnet of claim 1, wherein the first plate further comprises a Pb and/or Sn solder between the HTS material and the conductive material.

15. The magnet of claim 1, wherein the conductive material arranged over the HTS material comprises copper.

16. A magnet comprising:

a plurality of plates arranged in a stack that includes a first plate, the first plate comprising:

a conducting channel on a first side of the first plate, at least part of the conducting channel being arranged in a spiral path, the conducting channel comprising a high temperature superconductor (HTS) material and a conductive material; and a plurality of cooling channels formed by concave regions of the HTS material and/or conductive material within the conducting channel.

17. The magnet of claim 16, wherein the plurality of plates comprises a second plate, a first side of the second plate being arranged adjacent to the first side of the first plate, thereby bounding the plurality of cooling channels of the first plate.

18. The magnet of claim 17, wherein the first side of the second plate is planar.

19. The magnet of claim 17, wherein the plurality of cooling channels of the first plate is a first plurality of cooling channels, and wherein the first side of the second plate comprises a second plurality of cooling channels aligned with the first plurality of cooling channels.

20. The magnet of claim 19, wherein the conducting channel of the first plate is a first conducting channel, and wherein the second plate comprises a second conducting channel, the second plurality of cooling channels being formed by concave regions of HTS and/or conductive material within the second conducting channel.

21. The magnet of claim 19, further comprising a cooling inlet coupled to first ends of the first and second plurality of cooling channels and a cooling outlet coupled to second ends of the first and second plurality of cooling channels.

22. The magnet of claim 17, further comprising at least one bolt coupling the first plate to the second plate.

23. The magnet of claim 17, comprising a plurality of instances of the first plate and a plurality of instances of the second plate arranged in the stack, wherein the plurality of the plates in the stack alternate between the instances of the first plate and the instances of the second plate.

24. The magnet of claim 17, further comprising an insulating material arranged between the first plate and the second plate such that the first plate and second plate both contact the insulating material.

25. The magnet of claim 24, wherein the insulating material covers a portion of an interface between the first plate and the second plate so that at least part of the first plate directly contacts the second plate.

26. The magnet of claim 16, wherein at least part of each of the plurality of cooling channels is aligned with the spiral path of the at least part of the conducting channel.

27. The magnet of claim 16, wherein the spiral path is a racetrack spiral.

28. The magnet of claim 16, wherein the first plate is formed from a first material in which the conducting channel is formed, and wherein the first material comprises steel.

29. The magnet of claim 16, wherein the HTS material comprises a stack of HTS tapes.

30. The magnet of claim 29, wherein each HTS tape of the stack of HTS tapes comprises a rare earth barium copper oxide (REBCO) material wrapped in copper cladding.

31. The magnet of claim 16, wherein the first plate further comprises a Pb and/or Sn solder between the HTS material and the conductive material.

32. The magnet of claim 16, wherein the conductive material is arranged over the HTS material and wherein the plurality of cooling channels are formed within the conductive material.

33. The magnet of claim 16, wherein the conductive material comprises copper.

* * * * *